United States Patent
Crabtree et al.

(10) Patent No.: US 12,038,974 B2
(45) Date of Patent: *Jul. 16, 2024

(54) HIGH-PERFORMANCE, DYNAMICALLY SPECIFIABLE KNOWLEDGE GRAPH SYSTEM AND METHODS

(71) Applicant: QOMPLX LLC, New York, NY (US)

(72) Inventors: Jason Crabtree, Vienna, VA (US); Richard Kelley, Woodbridge, VA (US)

(73) Assignee: QOMPLX LLC, Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/506,973

(22) Filed: Nov. 10, 2023

(65) Prior Publication Data
US 2024/0078263 A1 Mar. 7, 2024

Related U.S. Application Data

(63) Continuation of application No. 17/982,457, filed on Nov. 7, 2022, now Pat. No. 11,886,507, which is a (Continued)

(51) Int. Cl.
*G06F 16/90* (2019.01)
*G06F 16/22* (2019.01)
(Continued)

(52) U.S. Cl.
CPC ...... *G06F 16/9024* (2019.01); *G06F 16/2272* (2019.01); *G06F 16/2458* (2019.01);
(Continued)

(58) Field of Classification Search
None
See application file for complete search history.

(56) References Cited

U.S. PATENT DOCUMENTS 6,256,544 B1 7/2001 Weissinger
10,503,786 B2 * 12/2019 Allen .................. G06F 16/93
(Continued)

FOREIGN PATENT DOCUMENTS

WO 2011011942 A1 2/2011
WO 2014159150 A1 10/2014
WO 2017075543 A1 5/2017

*Primary Examiner* — Hosain T Alam
*Assistant Examiner* — Cao D Vuong
(74) *Attorney, Agent, or Firm* — Galvin Patent Law LLC; Brian R. Galvin

(57) ABSTRACT

A system and method for technology analysis utilizing high-performance, scalable, multitenant, dynamically specifiable, knowledge graph information storage and utilization. The system uses an in-memory associative array for high-performance graph storage and access, with a non-volatile distributed database for scalable backup storage, a scalable, distributed graph service for graph creation, an indexing search engine to increase searching performance, and a graph crawler for graph traversal. One or more of these components may be in the form of a cloud-based service, and in some embodiments the cloud-based services may be containerized to allow for multitenant co-existence with no possibility of data leakage or cross-over. The system uses a cyber-physical graph to represent an enterprise's cyber-physical system and can provide graph analysis, graph security, and graph fusion related tasks to identify potential operational risks.

19 Claims, 18 Drawing Sheets

Related U.S. Application Data continuation-in-part of application No. 16/864,133, filed on Apr. 30, 2020, now Pat. No. 11,494,665, which is a continuation-in-part of application No. 15/847,443, filed on Dec. 19, 2017, now abandoned, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, said application No. 15/847,443 is a continuation-in-part of application No. 15/616,427, filed on Jun. 7, 2017, now abandoned, which is a continuation-in-part of application No. 14/925,974, filed on Oct. 28, 2015, now abandoned, said application No. 15/847,443 is a continuation-in-part of application No. 15/489,716, filed on Apr. 17, 2017, now abandoned, which is a continuation-in-part of application No. 15/409,510, filed on Jan. 18, 2017, now abandoned, which is a continuation-in-part of application No. 15/379,899, filed on Dec. 15, 2016, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, said application No. 15/790,327 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned.

(60) Provisional application No. 62/568,298, filed on Oct. 4, 2017, provisional application No. 62/568,291, filed on Oct. 4, 2017.

(51) Int. Cl.
*G06F 16/2458* (2019.01)
*G06F 16/28* (2019.01)
*G06F 16/901* (2019.01)
*G06F 18/20* (2023.01)
*G06N 5/02* (2023.01)

(52) U.S. Cl.
CPC ............ *G06F 16/284* (2019.01); *G06F 18/29* (2023.01); *G06N 5/02* (2013.01)

(56) References Cited

U.S. PATENT DOCUMENTS

| | | | |
|---|---|---|---|
| 2007/0012161 A1 | 1/2007 | Lyles | |
| 2008/0172353 A1 | 7/2008 | Lim et al. | |
| 2010/0153369 A1* | 6/2010 | Peoples | G06F 16/36 707/E17.014 |
| 2010/0228693 A1 | 9/2010 | Dawson et al. | |
| 2013/0041921 A1 | 2/2013 | Cooper et al. | |
| 2013/0346354 A1* | 12/2013 | Mizell | G06N 5/025 706/47 |
| 2014/0040975 A1 | 2/2014 | Raleigh et al. | |
| 2014/0074826 A1 | 3/2014 | Cooper et al. | |
| 2014/0280366 A1* | 9/2014 | Li | G06F 16/254 707/803 |
| 2015/0288712 A1* | 10/2015 | Jones | H04L 63/1433 726/25 |
| 2016/0063106 A1* | 3/2016 | Chai | G06F 16/9024 707/E17.014 |
| 2016/0275123 A1 | 9/2016 | Lin et al. | |
| 2016/0292192 A1* | 10/2016 | Bhagat | G06F 16/258 |

* cited by examiner

HIGH-PERFORMANCE, DYNAMICALLY SPECIFIABLE KNOWLEDGE GRAPH SYSTEM AND METHODS

CROSS-REFERENCE TO RELATED APPLICATIONS

Priority is claimed in the application data sheet to the following patents or patent applications, each of which is expressly incorporated herein by reference in its entirety:
Ser. No. 17/982,457
Ser. No. 16/864,133
Ser. No. 15/847,443
Ser. No. 15/790,457
62/568,298
Ser. No. 15/790,327
62/568,291
Ser. No. 15/616,427
Ser. No. 14/925,974
Ser. No. 15/489,716
Ser. No. 15/409,510
Ser. No. 15/379,899
Ser. No. 15/376,657
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536

BACKGROUND OF THE INVENTION

Field of the Invention

The present invention is in the field of computer systems and algorithms for context-based searching and complex knowledge data set development for application to observed operational events.

Discussion of the State of the Art

It is increasingly the case that the data of organizations (businesses, governments, etc.) is exceeding the ability of those organizations to classify, store, search, manage, and utilize the data. There is so much information available even in mid-sized organizations that much data becomes lost, inaccessible, or simply stored away with no effective means of utilizing it. This inability to utilize such large datasets within an organization represents an enormous lost potential. Knowledge graphs represent a potential means organizing this mass of data and making it accessible and usable, but no system or method exists which incorporates all of the elements necessary to make the process practical for a given organization, much less providing a high-performance, scalable system suitable for providing such a service to multiple clients simultaneously.

What is needed is a system and method for a high-performance, scalable, multitenant, dynamically specifiable, knowledge graph-based information storage and utilization which can be leveraged to perform cybersecurity analysis of an enterprise's cyber-physical system.

SUMMARY OF THE INVENTION

The inventor has developed, and reduced to practice, a high-performance, dynamically specifiable knowledge graph system. The system uses an in-memory associative array for high-performance graph storage and access, with a non-volatile distributed database for scalable backup storage, a scalable, distributed graph service for graph creation, an indexing search engine to increase searching performance, and a graph crawler for graph traversal. One or more of these components may be in the form of a cloud-based service, and in some embodiments the cloud-based services may be containerized to allow for multitenant co-existence with no possibility of data leakage or cross-over. The system uses a cyber-physical graph to represent an enterprise's cyber-physical system and can provide graph analysis, graph security, and graph fusion related tasks to identify potential cybersecurity threats.

According to a preferred embodiment, a high-performance, dynamically specifiable knowledge graph system is disclosed, comprising: a computing device comprising a processor and a memory; an in-memory associative array comprising key-value pairs stored in the memory of the computing device and configured to represent a knowledge graph; an integration platform comprising a first plurality of programming instructions stored in the memory of, and operating on the processor of, the computing device, wherein the first plurality of programming instructions, when operating on the processor, cause the computing device to: compile a received schema into data types, each data type comprising an entity definitions, one or more link definitions, and one or more attribute definitions; receive one or more data clumps, each data clump comprising entity, link, and attribute data; determine whether each data clump complies with the schema; enforce compliance of each data clump by accepting compliant data clumps and rejecting non-compliant data clumps; send the compliant data clumps to the knowledge graph engine for assembly into a new knowledge graph that is created to be fully compliant with the schema; and the knowledge graph engine comprising a second plurality of programming instructions stored in the memory of, and operating on the processor of, the computing device, wherein the second plurality of programming instructions, when operating on the processor, cause the computing device to: obtain the compiled schema; instantiate the knowledge graph in the in-memory associative array; receive data clumps from the integration platform wherein the data clumps are known to be fully compliant with the schema; and populate the knowledge graph in the in-memory associative array with the entity, link, and attribute data in each fully-compliant data clump.

According to another preferred embodiment, a high-performance, dynamically specifiable knowledge graph system is disclosed, comprising: a computing device comprising a processor and a memory; a distributed in-memory associative array comprising key-value pairs stored in the memory of a plurality of networked computing devices and configured to represent a knowledge graph; an integration platform comprising a first plurality of programming instructions stored in the memory of, and operating on the processor of, the computing device, wherein the first plurality of programming instructions, when operating on the processor, cause the computing device to: compile a received schema into data types, each data type comprising an entity definitions, one or more link definitions, and one or more attribute definitions; send the compiled schema to a cloud-based knowledge graph service, wherein the cloud-based knowledge graph service: obtains the compiled schema; instantiates a knowledge graph; retrieve the knowledge graph from the knowledge graph service and implement the knowledge graph in the distributed in-memory associative array; receive one or more data clumps, each data clump comprising entity, link, and attribute data; determine whether each data clump complies with the schema; enforce compliance of each data clump by accepting compliant data clumps and rejecting non-compliant data clumps; send each compliant data clump to the cloud-based knowledge graph service engine for assembly into a new knowledge graph that is created to be fully compliant with the schema, wherein the cloud-based knowledge graph service: receives data clumps from the integration platform wherein the data clumps are known to be fully compliant with the schema; and populates the knowledge graph in the distributed in-memory associative array with the entity, link, and attribute data in each fully-compliant data clump; and retrieve the populated knowledge graph from the knowledge graph service and update the distributed in-memory associative array with the populated knowledge graph.

According to another preferred embodiment, a method for operating a high-performance, dynamically specifiable knowledge graph system is disclosed, comprising the steps of: instantiating a distributed in-memory associative array comprising key-value pairs stored in the memory of a plurality of networked computing devices and configured to represent a knowledge graph; compiling a received schema into data types, each data type comprising an entity definition, one or more link definitions, and one or more attribute definitions; sending the compiled schema to a cloud-based knowledge graph service, wherein the cloud-based knowledge graph service: obtains the compiled schema; and instantiates a knowledge graph; retrieving the knowledge graph from the knowledge graph service and implementing the knowledge graph in the distributed in-memory associative array; receiving one or more data clumps, each data clump comprising entity, link, and attribute data; determining whether each data clump complies with the schema; enforcing compliance of each data clump by accepting compliant data clumps and rejecting non-compliant data clumps; sending each compliant data clump to the cloud-based knowledge graph service, wherein the cloud-based knowledge graph service: receives compliant data clumps from the integration platform; and populates the knowledge graph in the distributed in-memory associative array with the entity, link, and attribute data in each data clump; retrieving the populated knowledge graph from the knowledge graph service and updating the distributed in-memory associative array with the populated knowledge graph.

According to an aspect of an embodiment, the integration platform uses a cloud-based graph access control module which is configured to assign access rights to a user, the access rights allowing the user to interact with a at least one node, and its associated edges, of the knowledge graph.

According to an aspect of an embodiment, the integration platform is further configured to: retrieve one or more known schemas from a database; apply a known schema to the one or more data clumps; identify any errors in the application of the known schema to the data clumps and compute an error rate based on any identified errors; wherein if the error rate is below a predetermined threshold value the known schema is added to a list; and display the list to a user, wherein the user can optionally select a known schema from a plurality of known schemas on the list.

According to an aspect of an embodiment the integration platform uses a cloud-based graph manager which is configured to: receive a network event, the network event related to an observed operational event; apply a known schema to create a constrained knowledge graph; analyze the constrained knowledge graph to identify a cybersecurity threat; generate one or more subgraphs from the constrained knowledge graph based on the identified cybersecurity threat, wherein each subgraph maps the identified cybersecurity threat to a threat scenario; perform graph fusion on the subgraphs to form a fused knowledge graph; store the fused knowledge graph in a database; and present the fused knowledge graph to a user for graph analysis.

According to an aspect of an embodiment, the knowledge graph is a cyber-physical graph representing an enterprise's cyber-physical system.

According to an aspect of an embodiment, the integration platform, the distributed in-memory associative array and the cloud-based knowledge graph service are instantiated as services in a containerized service management application.

According to an aspect of an embodiment, separate copies of the integration platform, the distributed in-memory associative array, and the cloud-based knowledge graph service are instantiated for each client as services in a containerized service management application.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
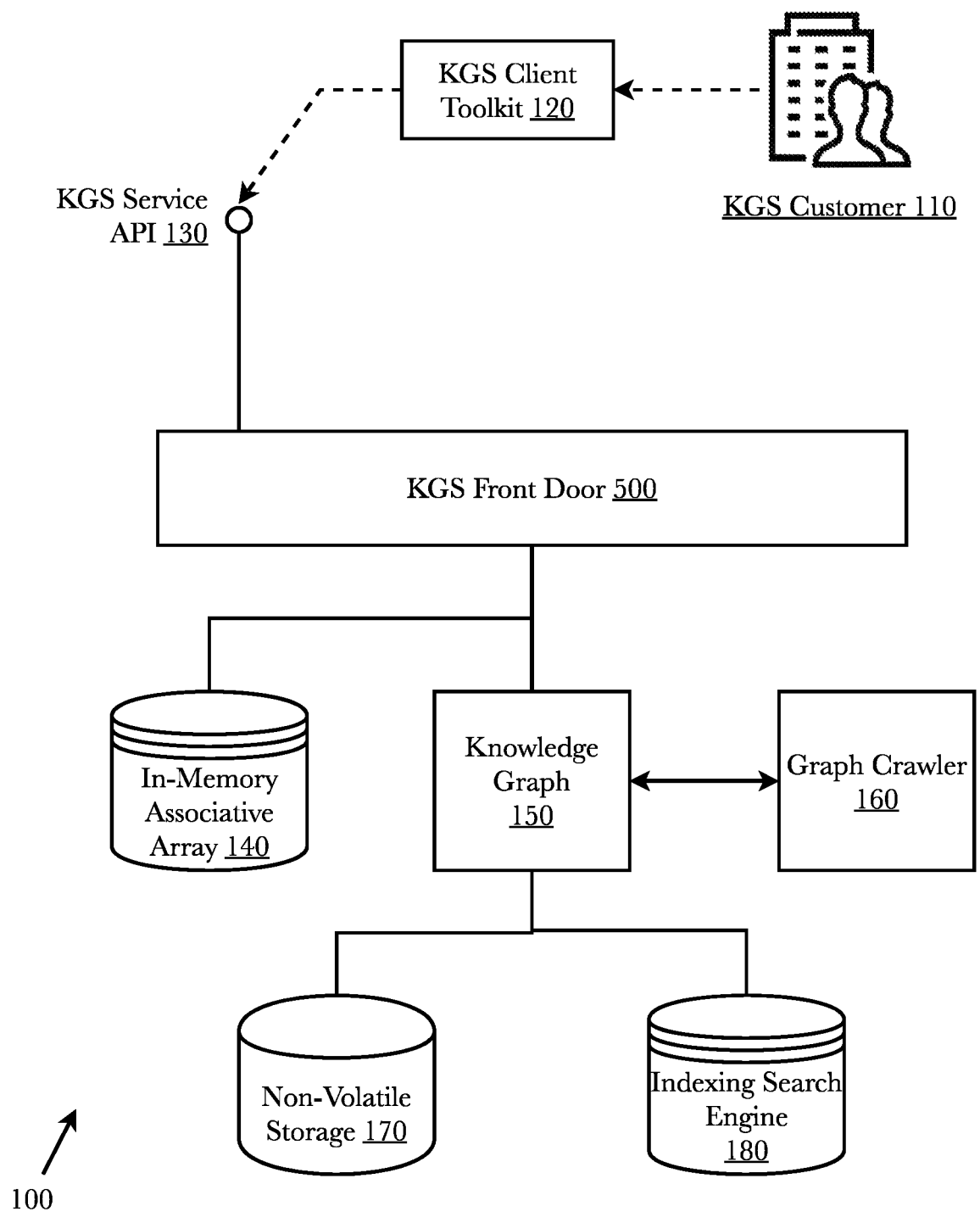
FIG. 1 is a block diagram showing an exemplary embodiment of a system for multitenant graph databases with dynamic specification and enforcement of ontological data models.

The inventor has conceived, and reduced to practice, a high-performance, dynamically specifiable knowledge graph system and a method for operating the same. The system uses an in-memory associative array for high-performance graph storage and access, with a non-volatile distributed database for scalable backup storage, a scalable, distributed graph service for graph creation, an indexing search engine to increase searching performance, and a graph crawler for graph traversal. One or more of these components may be in the form of a cloud-based service, and in some embodiments the cloud-based services may be containerized to allow for multitenant co-existence with no possibility of data leakage or cross-over. The system uses a cyber-physical graph to represent an enterprise's cyber-physical system and can provide graph analysis, graph security, and graph fusion related tasks to identify potential cybersecurity threats.

As the field of knowledge engineering grows, there has been an increased focus on the use of ontologies to classify information. A number of ontological databases exist, most related to a particular field of application (e.g., medicine, scientific information retrieval, business organization, etc.). Existing ontologies are manually created, which is a labor-intensive and time consuming process, and limits the scope of each ontology. Merging of ontologies is also a manual process, limiting the creating of broader ontologies that represent most or all of human knowledge.

Knowledge graphs, which use defined ontologies to improve search accuracy, efficiency, and relevance, are on the rise. The use of ontologies and taxonomies is central to increasingly generalized search capabilities to capture human knowledge across a diverse set of domains, languages, and even dialects. The need for ontologies stems from the fact that human language, as opposed to machine specifications, can be ambiguous, non-literal, and redundant. When presented with a search, a service must determine not only that something is an entity, but what type and in what context. Most types of queries remain dependent on syntactic vs semantic search characteristics.

It is increasingly the case that the data of organizations (businesses, governments, etc.) is exceeding the ability of those organizations to classify, store, search, manage, and utilize the data. There is so much information available even in mid-sized organizations that much data becomes lost, inaccessible, or simply stored away with no effective means of utilizing it. This inability to utilize such large datasets within an organization represents an enormous lost potential. Knowledge graphs represent a potential means organizing this mass of data and making it accessible and usable by automating processing of semantic information, but no system or method exists which incorporates all of the elements necessary to make the process practical for a given organization, much less providing a high-performance, scalable system suitable for providing such a service to multiple clients simultaneously.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Domain-specific ontology" refers to a hierarchal taxonomy of concepts and their relationships within a particular ontological domain (i.e., a set of reference ideas that establishes context). For example, the word "card" has many different meanings, depending on the ontological domain (context) in which it is used. In the domain of poker, the term "card" would refer to a "playing card" as used in playing the game of poker. In the domain of computer software, the term "card" may refer to the antiquated "punch card" form of information storage. In the domain of computer hardware, the term "card" could refer to a "video card", an "SD card" (a type of memory storage device), or similar pieces of hardware.

"Knowledge graph stack" or "KGS" is used as shorthand to refer to a system for multitenant graph databases with dynamic specification and enforcement of ontological data models, although other terms such as system, method, methodology, etc., may be used.

"Ontology" refers to a formal naming and definition of the types, properties, and interrelationships of the entities that exist in a particular domain of discourse. Ontologies are a method of classification of things and their relationships with other things. They are related to, but more flexible than, taxonomies, hierarchies, and class definitions given that relationships between concept entities can be specified. The term ontologies, as used herein, has the meaning associated with information and computer science, rather than the definition used in philosophy of classifying things as they exist in reality.

Conceptual Architecture

FIG. 1 is a block diagram showing an exemplary embodiment 100 of a system for multitenant graph databases with dynamic specification and enforcement of ontological data models. In this embodiment, the system comprises a knowledge graph stack (KGS) client toolkit 120, a KGS service API 130 (i.e., a customer access portal or client access portal), a KGS front door 500, an in-memory associative array 140, a knowledge graph 150, a graph crawler 160, a non-volatile storage medium 170, and an indexing search engine 180. A KGS customer 110 uses the provided KGS client toolkit 120 to develop an ontological schema for classification of data and to utilize the KGS system 100.

Access to the system is made through a KGS service API 130, which interacts with the KGS front door 500 through a pre-defined messaging protocol. The messaging protocol defines a (possibly proprietary) set of messages being exchanged over the network between KGS customers 110 and the KGS system 100. Messages may be split into command messages (e.g., MakeBowl, UploadSchema, IngestClump, etc.) and event messages (e.g., BowlMade, SchemaUploaded, ClumpIngested, etc.). The messaging protocol further defines how the KGS messages can be transported over the network (by using which envelopes). Examples of popular Internet protocols which can be used to transport KGS messages are: raw TCP, HTTP/TLS, Kafka, protobuffers, AMQP, etc.

The KGS client toolkit 120 is a software package provided to KGS customers 110 to facilitate their usage of the KGS system 100. The KGS client toolkit 120 provides the means for KGS customers 110 to access and use the KGS system 100, and may contain either a command line interface or a graphical user interface, and further may contain client libraries in popular programming languages to facilitate programming client-specific applications for utilizing the KGS system 100.

The KGS front door 500 (which may also be described as an integration platform or coordination platform) acts as the gateway to the system, and coordinates the operation and interaction of the various components of the KGS system 100. Communication between the KGS client toolkit 120 and the KGS service API may be configured as a point-to-point connection, wherein the KGS client toolkit 120 connects directly to the KGS front door 500 at the KGS service API 130, or as a hub-and-spoke connection, wherein the KGS client toolkit 130 connects intermediary brokers (e.g. Kafka brokers). Other communication patterns are possible.

The in-memory associative array 140 provides a high-performance means of database storage and access. In effect, it acts simultaneously as data storage and a data cache, such that data is instantly available without having to read it from non-volatile storage such as a hard drive. Data from an in-memory associative array 140 is backed up to non-volatile storage, but is always accessed in-memory during usage. The in-memory associative array 140 is used to store in memory the knowledge graph of the KGS system as key-value pairs. This allows for high-speed manipulation of the knowledge graph, especially for very large graphs. An example of an in-memory associative array 140 implementation is Redis which is open source, in-memory data structure store, that can be used as a database, cache and message broker. An implementation like Redis can be configured to store in memory the knowledge graph of the KGS system as key-value pairs, as noted above.

The knowledge graph 150 is a graph abstract data type containing vertices (sometimes called nodes) and edges between the vertices. The vertices in a graph represent pieces of information and the edges between the vertices represent relationships between the pieces of information. The edges of a graph may have directionality, such that relationships between certain vertices are uni-directional, and may have a numerical weight, which can represent the strength or probability of a relationship between vertices. In a knowledge graph 150, the relationships are structured based on ontological relationships, rather than taxonomies or hierarchies. For scalability purposes, a distributed cloud-based knowledge graph implementation is useful. An example of such an implementation is JanusGraph, a distributed, open source, massively scalable graph database. A service like JanusGraph can be configured to operate as the knowledge graph 150 of the KGS system.

The non-volatile storage 170 stores the knowledge graph 150 and a backup of its in-memory associative array 140 implementation. For scalability purposes, some form of distributed non-volatile storage 170 is useful. An example of such an implementation is Cassandra, a distributed, open source, scalable database. An implementation like Cassandra can be configured to operate as the non-volatile storage 170 of the KGS system.

An indexing search engine 180 is used to index and search the knowledge graph 150. For scalability purposes, a distributed, scalable indexing search engine 180 is useful. An example of such an implementation is Elasticsearch, a distributed, scalable search engine that provides near real-time search capabilities. An indexing search engine indexing search engine 180 like Elasticsearch can be configured to operate as the indexing search engine 180 of the KGS system.

A graph crawler 160 may be used to traverse and query the knowledge graph 150. A graph traversal language such as Gremlin can be used to automatically implement efficient graph traversal strategies.

Figure 2:
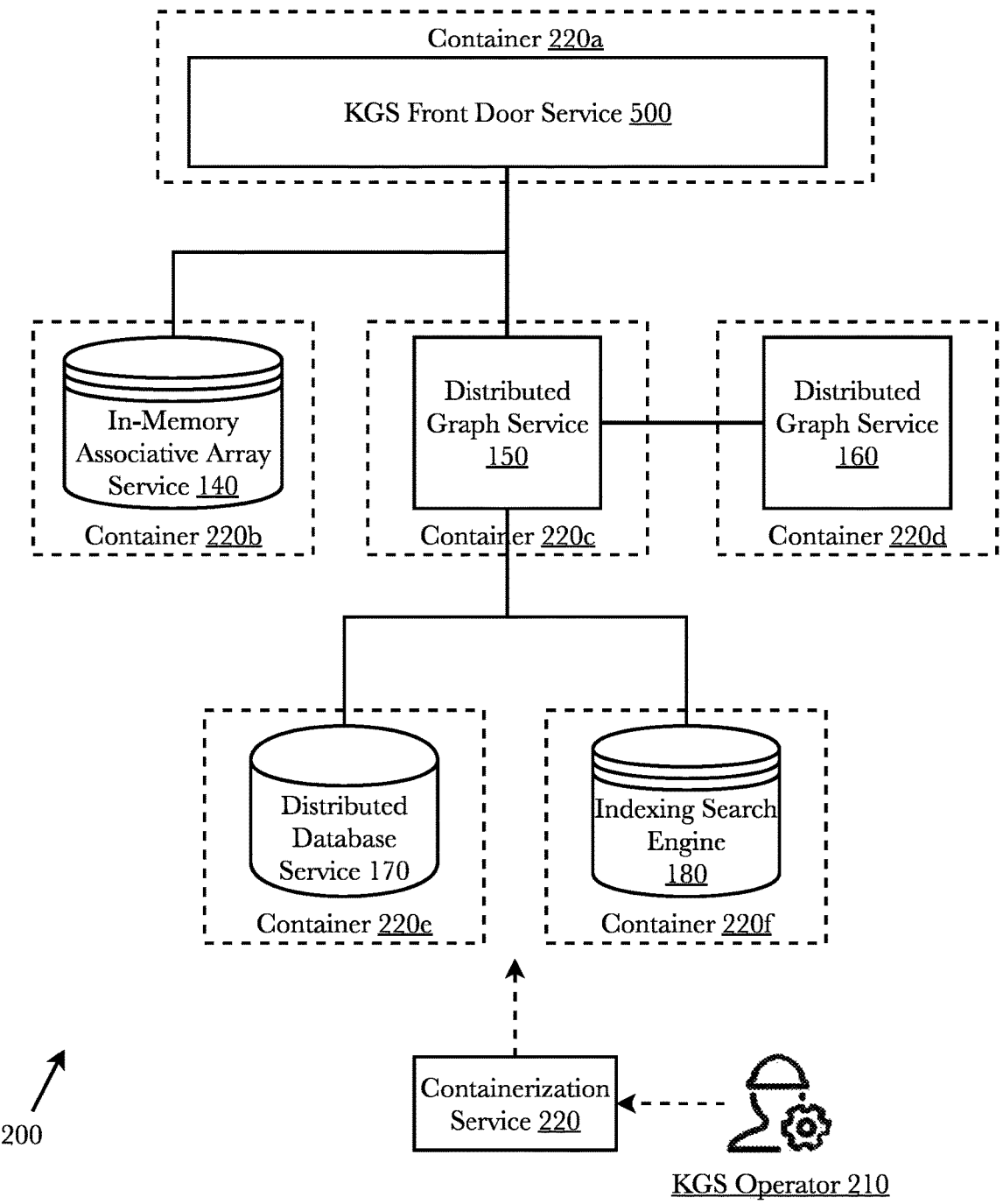
FIG. 2 is a block diagram showing another exemplary embodiment of a system for multitenant graph databases with dynamic specification and enforcement of ontological data models wherein each of the components is a containerized service.

FIG. 2 is a block diagram showing another exemplary embodiment 200 of a system for multitenant graph databases with dynamic specification and enforcement of ontological data models wherein each of the components is a containerized service. In a particularly useful embodiment, each of the components of the system is instantiated as a containerized service, all of which are distributed and scalable, and some of which are cloud-based services. A KGS operator 210 uses a containerization service 220 to automate the deployment, scaling, and management of the various components of the KGS system 200. Similar to the previous embodiment, the system comprises a KGS front door 230, an in-memory associative array service 240, a distributed graph service 250, a graph crawler service 260, a distributed database service 270, and an indexing search engine service 180. However, in this case, each of the services is instantiated as a containerized service 220*a-f*, managed by the KGS operator 210 using the containerization service 220. In this way, all of the components of the KGS system can be instantiated separately for each client to prevent any data leakage or data cross-over from using the same service for multiple clients. An example of such a containerization service 220 is Kubernetes, an open-source container-orchestration system. A containerization service 220 like Kubernetes can be configured to operate as the containerization service 220 of the KGS system.

Figure 3:
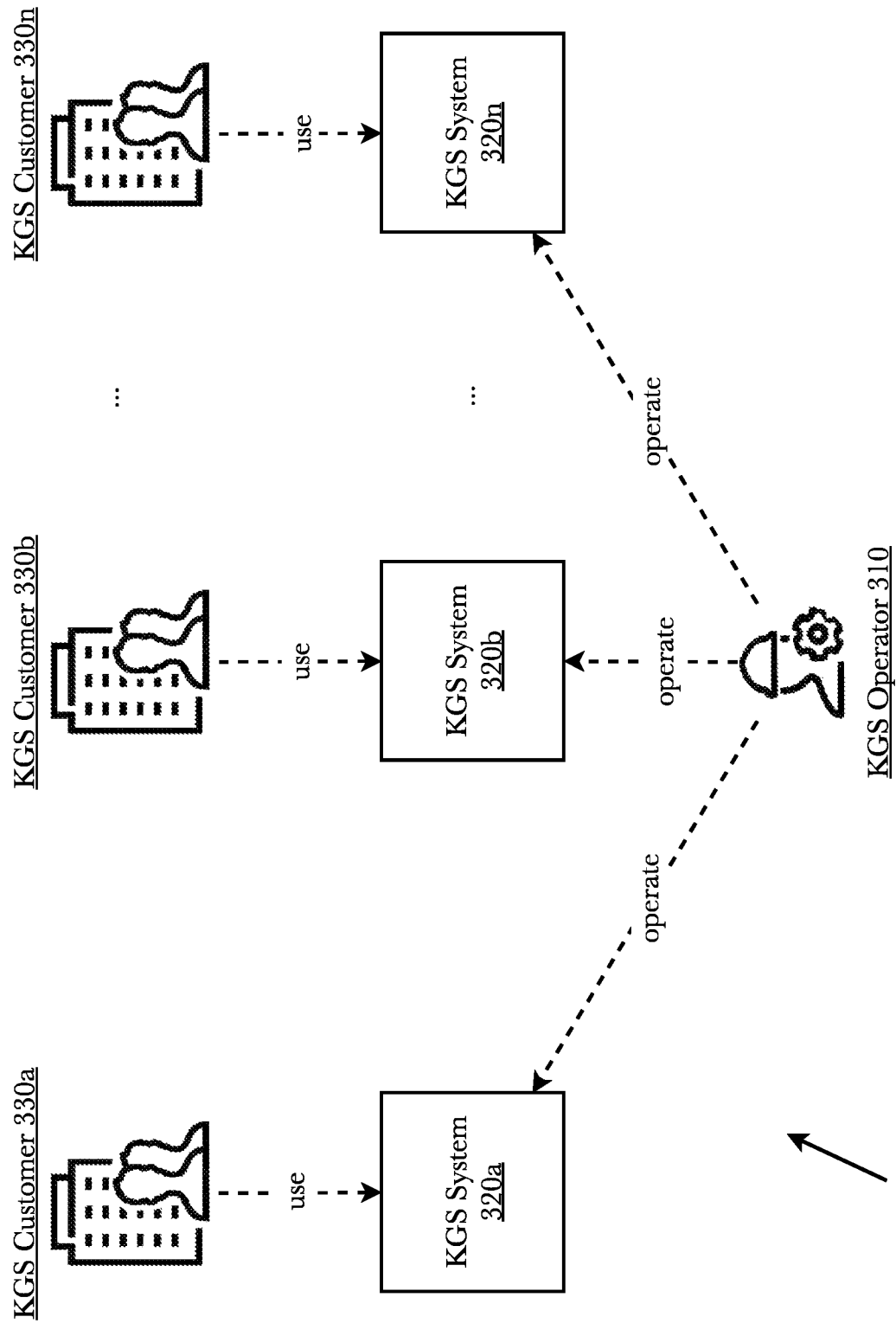
FIG. 3 is a block diagram showing instantiation and operation of separate KGS systems for each of a plurality of clients.

FIG. 3 is a block diagram showing instantiation and operation of separate KGS systems 320*a-n* for each of a plurality of customers 330*a-n*. As noted above, particularly where the components of the KGS system are containerized services, separate instances of the KGS system can be instantiated for each client 330*a-n* in a "shared nothing" implementation. Even where some of the services are designed to be multi-client services, such an implementation is easier to manage and better for data privacy, security, and governance, as there is no possibility of bleed-through or accidental display of data from one client 330*a-n* to another 330*a-n*.

Figure 4:
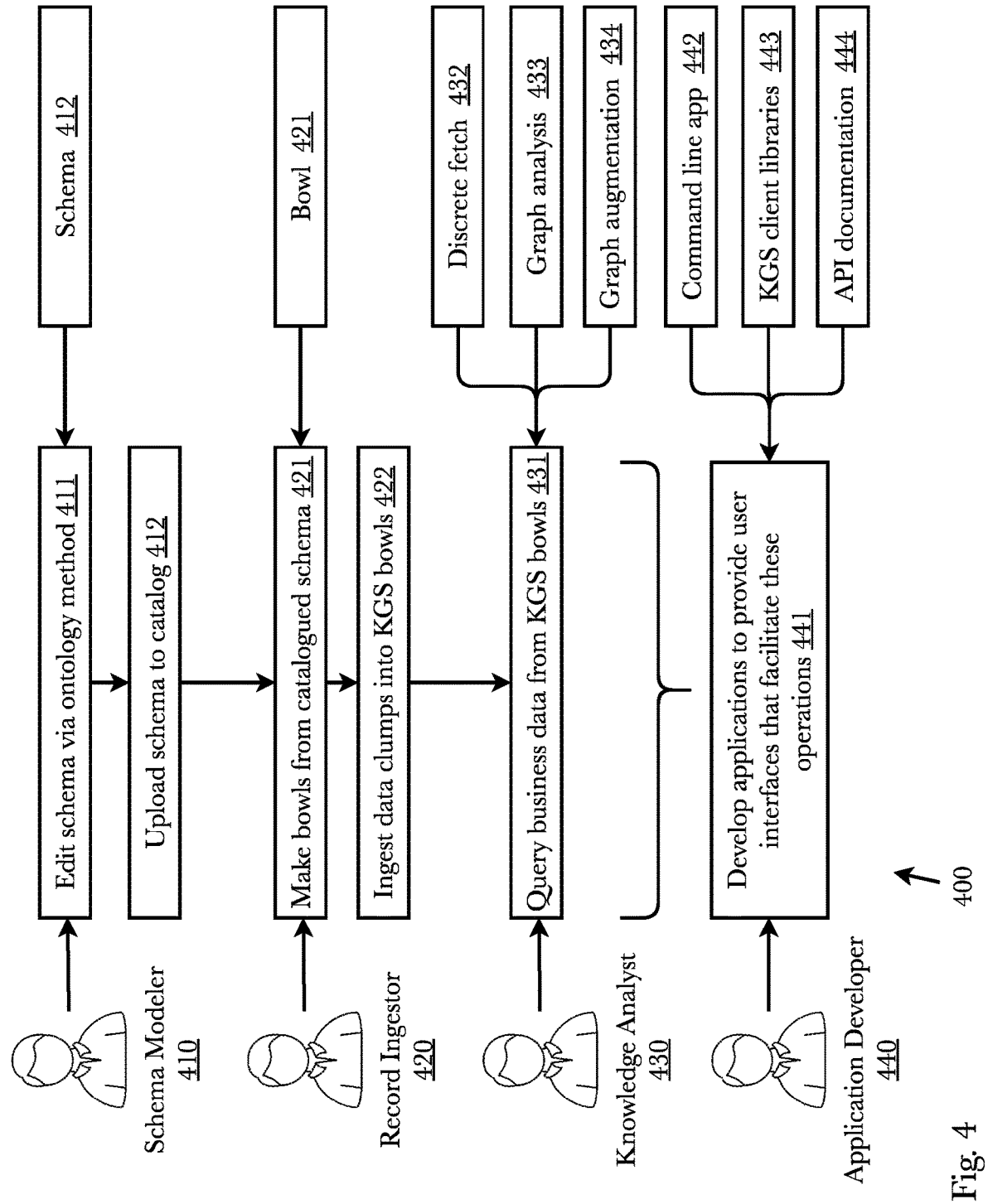
FIG. 4 is a block diagram showing the stages of setup and use of a KGS system and the roles of personnel who may use the system.

FIG. 4 is a block diagram showing the stages of setup and use of a KGS system and the roles of personnel who may use the system. In the first stage of utilization of the KGS system, a schema modeler 410 for the organization creates a schema 412 for the organization's data. A schema is an ontological representation of the organization and its data. The schema may include any information about the organization, including but not limited to, the organization's legal structure, business operational structure, personnel, data locations, data hierarchy, data sources, network structure, etc. An organization may have more than one schema. The schema defines entities, links, and attributes (ELAs), with entities being data points of interest, links being relationships between the entities, and attributes being additional descriptors that define either the entities or links. In some embodiments, the schema may be a text file, for example a resource description framework (RDF) "turtle" file (a file meeting the RDF standards and usually having a ".ttl" file extension). Once the schema is created 411, the schema modeler 410 uploads it to a schema complier, which converts the schema 412 into abstract data types, which are then stored in a catalog. The KGS client toolkit 120 contains a schema editor, which allows the schema modeler 410 to create a schema 411 using a structured interface.

In the second stage of utilization of the KGS system, a record ingestor 420 creates bowls 421 from the schema 412. A bowl 421 is a graph database, but constrained to a schema 412. When the record ingestor 420 creates a bowl 421, the KGS system creates a new (empty) knowledge graph and associates it with that schema 412. After the bowl 421 is created, the record ingestor 420 feeds data clumps into the bowl 421 for ingestion by the system and population of the knowledge graph. A KGS data clump is a block of write instructions, described using entity, link, and attribute (ELA) records. Each instruction may specify the action to be performed on the knowledge graph (e.g., insert, update, etc.). The KGS system ingests the data clump, making sure the ELA records are validated and enforced against the schema associated with the target bowl. In some embodiments, the data clump is ingested atomically, wherein the ingestion of the data clump must either completely succeed (write all ELA records), or completely fail (with no persistent effect). This atomic ingestion of clumps provides protection against invalid data being gradually introduced into the knowledge graph.

In the third stage of utilization, the data is ready for use. A knowledge analyst 430 is able to utilize the system to provide useful information by submitting queries for business data from a KGS bowl 421. Such queries may take many forms, and a non-limiting list of such queries follows. A discrete fetch 432 may be used wherein the knowledge analyst 430 submits business-keys of interest, and the KGS bowl 421 replies with block of exactly-matching ELA records. A graph analysis may be performed, wherein the knowledge analyst 430 requests application of a known analysis algorithm to the knowledge graph, and the KGS bowl 421 returns result set in appropriate form. A graph augmentation may be performed, wherein the knowledge analyst 430 requests that calculated results be persisted in the knowledge graph, such that they are retained for future analyses.

An application developer 440 may also be employed to develop applications using the KGS client toolkit 120 to facilitate any of the above operations. The KGS client toolkit 120 may provide the application developer with a command line application 442 (or graphical user interface), KGS client libraries in popular programming languages 443 to facilitate programming client-specific applications for utilizing the KGS system, and additional resources such as API documentation 444.

In some implementations, offensive and defensive analysis of a cyber-physical system may be conducted using the cyber-physical graph. The constrained cyber-physical graph may be analyzed to identify threats (i.e., offensive and defensive threats). For example, the constrained graph can be analyzed to identify suspicious activity (e.g., a general user client attempting to gain access to an administrator client), known malicious activity (e.g., a golden ticket attack, a denial-of-service attack, etc.), published vulnerabilities (e.g., published list of known software exploits used to check if installed software is susceptible/has been updated to patch exploit vulnerability), and descriptive data that differs from expected data based on device configurations (e.g., "The configurations say this firewall should act like X, but is doing Y", "This account shouldn't be able to access that resource", "This host should be completely isolated but it's showing up in access logs", etc.). Once a constrained cyber-physical graph has been analyzed to identify all (potential) threats, secondary graphs may be built for the identified threats. The secondary graph built for the identified threats can be used to model "what could happen" to an organization's constrained cyber-physical system (e.g., schema constrained network) in the event of a cyber threat occurring. Additionally, the secondary graph can be analyzed to map vectors of vulnerabilities to identify risk. Likewise, the secondary graph can be analyzed to map one or more cyberattack paths through a network. In some implementations, the secondary graph can map account/privilege relationships that could reveal vulnerabilities or past network compromises. In some implementations, some or all of these secondary graphs may be constructed as nested graphs, wherein the secondary graphs are all built or derived from the first constrained graph.

Figure 5:
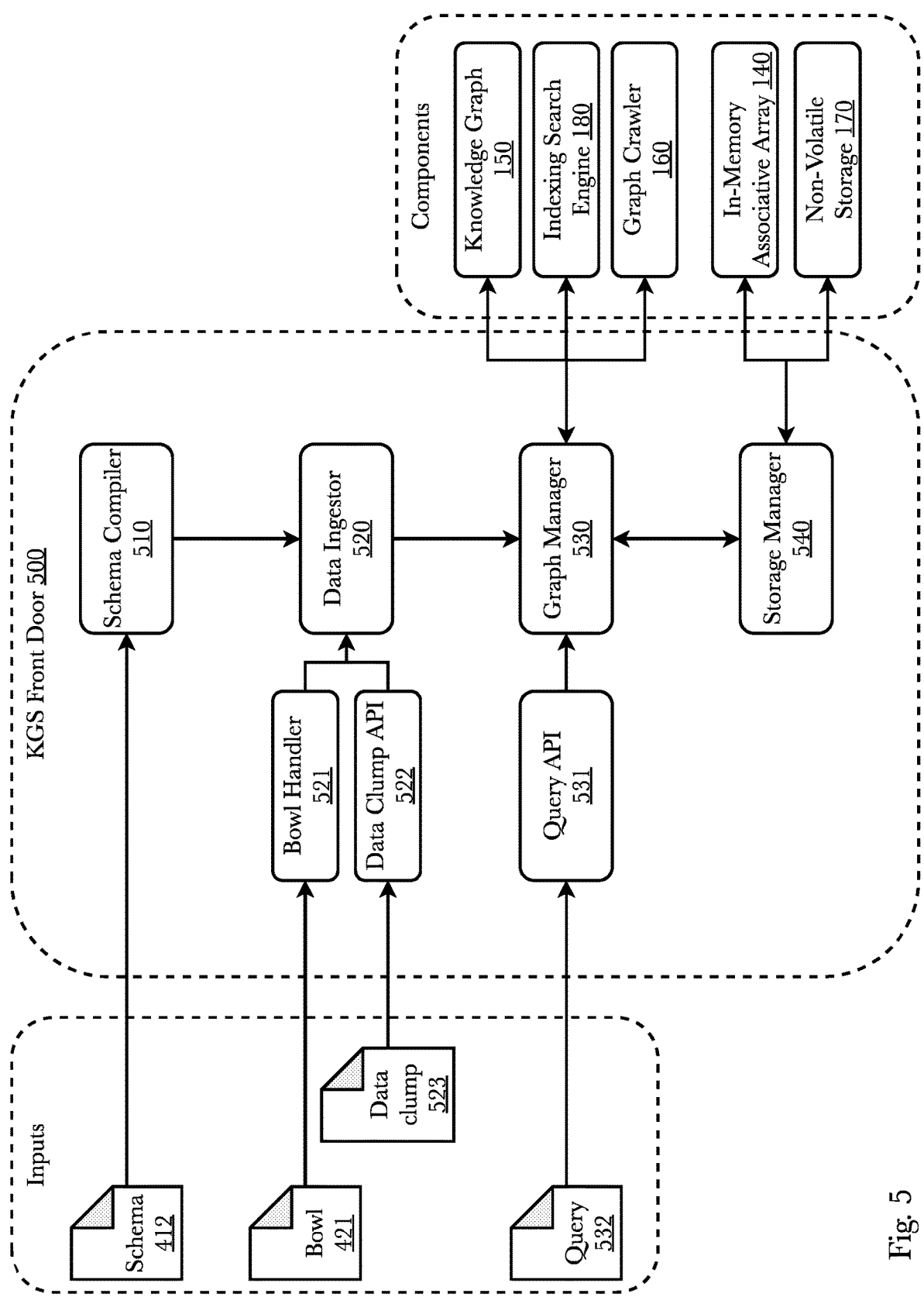
FIG. 5 is a block diagram showing additional detail regarding the KGS front door aspect of a KGS system.

FIG. 5 is a block diagram showing additional detail regarding the KGS front door 500 aspect of a KGS system. The KGS front door comprises a schema compiler 510, a data ingestor 520, a bowl handler 521, a data clump API 522, a graph manager 530, a query API 531, and a storage manager 540. Each of these components of the KGS front door 500 manages and coordinates the operation of one or more of the components that make up the KGS system 100 (which, as noted earlier, may comprise distributed, cloud-based services in some embodiments).

The schema compiler receives a schema 412, compiles the text of the schema into abstract data objects, and stores the abstract data objects associated with the schema in a catalog. The catalog (not shown) may be a database stored in the distributed database 150. The bowl handler 521 receives a bowl 421 and sends it to the data ingestor 520. The data ingestor 520 feeds the bowl 421 to the graph manager, which creates a new (empty) knowledge graph 150 for storage of data. The data clump API 522 receives data clumps 523 (e.g., of business data) fed into the system and sends them to the data ingestor 520, which ingests the data clumps 523, making sure the ELA records are validated and enforced against the schema 412 associated with the target bowl 421. In some embodiments, the data clump 523 is ingested atomically, wherein the ingestion of the data clump 523 must either completely succeed (write all ELA records), or completely fail (with no persistent effect). This atomic ingestion of data clumps 523 provides protection against invalid data being gradually introduced into the knowledge graph 150. The graph manager 530 coordinates creation of the knowledge graph 140, indexing and management of the knowledge graph 150, and queries of, and operations on, the knowledge graph 150. The graph manager 530 may use one or more distributed, cloud-based services to implement each of these functions, retaining for itself the role of coordinating the interaction of the various services. The query API 531 receives queries 532, and sends them to the graph manager 530, which then coordinates the operations on the knowledge graph 150, the indexing search engine 180, and the graph crawler 160, as necessary to implement the query 532 and return appropriate results. The storage manager coordinates the operations and interactions of the in-memory associative array 140 and the non-volatile storage 170, which are backend functions of the system not normally seen or accessed by users of the system.

Figure 9:
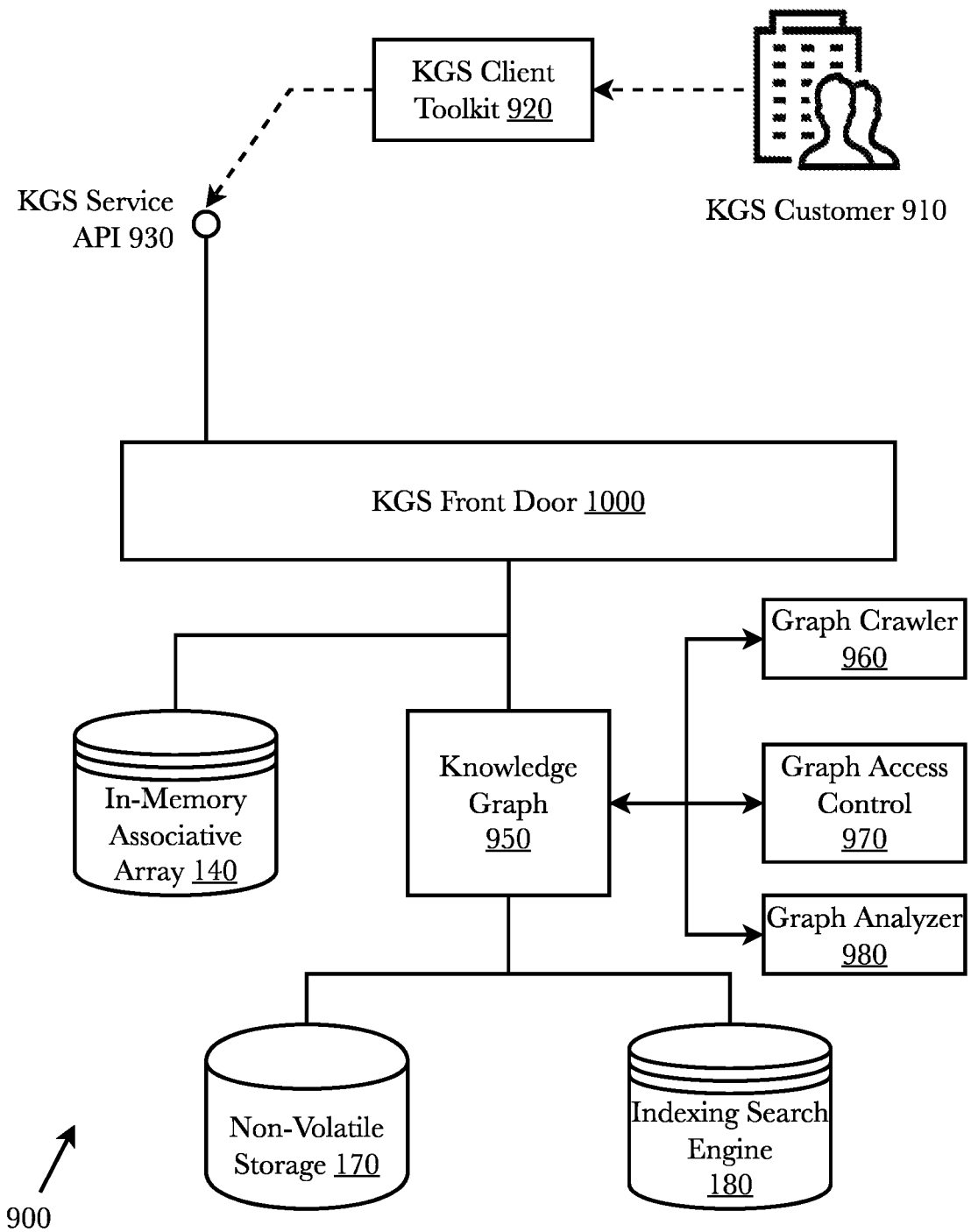
FIG. 9 is a block diagram showing an exemplary embodiment of a system for multitenant graph databases with dynamic specification and enforcement of ontological data models for cybersecurity or operational event detection and mitigation.

FIG. 9 is a block diagram showing an exemplary embodiment 900 of a system for multitenant graph databases with dynamic specification and enforcement of ontological data models for cybersecurity or operational event detection and mitigation. It should be appreciated that this system 900 can be implemented on a single platform such as a computing device comprising a memory and at least one processor. It should be further appreciated that the system can be implemented in a distributed architecture utilizing one or more computing devices (e.g., at a data center) which may be geographically distributed (e.g., at two to or more data centers at separate locations). In this embodiment, the system comprises a knowledge graph stack (KGS) client toolkit 920, a KGS service API 930 (i.e., a customer access portal or client access portal), a KGS front door 1000, an in-memory associative array 140, a knowledge graph 950, a graph crawler 960, a graph access control module 970, a graph analyzer 980, a non-volatile storage medium 170, and an indexing search engine 180. A KGS customer 910 uses the provided KGS client toolkit 920 to develop an ontological schema for classification of data and to utilize the KGS system 900.

Access to the system is made through a KGS service API 930, which interacts with the KGS front door 1000 through a pre-defined messaging protocol. The messaging protocol defines a (possibly proprietary) set of messages being exchanged over the network between KGS customers 910 and the KGS system 900. Messages may be split into command messages (e.g., MakeBowl, UploadSchema, IngestClump, etc.) and event messages (e.g., BowlMade, SchemaUploaded, ClumpIngested, etc.). The messaging protocol further defines how the KGS messages can be transported over the network (by using which envelopes). Examples of popular Internet protocols which can be used to transport KGS messages are: raw TCP, HTTP/TLS, Kafka, protobuffers, AMQP, etc.

The KGS client toolkit 920 is a software package provided to KGS customers 910 to facilitate their usage of the KGS system 1000. The KGS client toolkit 920 provides the means for KGS customers 910 to access and use the KGS system 900, and may contain either a command line interface or a graphical user interface, and further may contain client libraries in popular programming languages to facilitate programming client-specific applications for utilizing the KGS system 900.

The KGS front door 1000 (which may also be described as an integration platform or coordination platform) acts as the gateway to the system, and coordinates the operation and interaction of the various components of the KGS system 900. Communication between the KGS client toolkit 920 and the KGS service API may be configured as a point-to-point connection, wherein the KGS client toolkit 920 connects directly to the KGS front door 1000 at the KGS service API 130, or as a hub-and-spoke connection, wherein the KGS client toolkit 930 connects intermediary brokers (e.g. Kafka brokers). Other communication patterns are possible.

The in-memory associative array 140 provides a high-performance means of database storage and access. In effect, it acts simultaneously as data storage and a data cache, such that data is instantly available without having to read it from non-volatile storage such as a hard drive. Data from an in-memory associative array 140 is backed up to non-volatile storage, but is always accessed in-memory during usage. The in-memory associative array 140 is used to store in memory the knowledge graph of the KGS system as key-value pairs. This allows for high-speed manipulation of the knowledge graph, especially for very large graphs. An example of an in-memory associative array 140 implementation is Redis which is open source, in-memory data structure store, that can be used as a database, cache and message broker. An implementation like Redis can be configured to store in memory the knowledge graph of the KGS system as key-value pairs, as noted above.

The knowledge graph 950 is a graph abstract data type containing vertices (sometimes called nodes) and edges between the vertices. The vertices in a graph represent pieces of information and the edges between the vertices represent relationships between the pieces of information. The edges of a graph may have directionality, such that relationships between certain vertices are uni-directional, and may have a numerical weight, which can represent the strength or probability of a relationship between vertices. In a knowledge graph 950, the relationships are structured based on ontological relationships, rather than taxonomies or hierarchies. For scalability purposes, a distributed cloud-based knowledge graph implementation is useful. An example of such an implementation is JanusGraph, a distributed, open source, massively scalable graph database. A service like JanusGraph can be configured to operate as the knowledge graph 950 of the KGS system.

The non-volatile storage 170 stores the knowledge graph 950 and a backup of its in-memory associative array 140 implementation. For scalability purposes, some form of distributed non-volatile storage 170 is useful. An example of such an implementation is Cassandra, a distributed, open source, scalable database. An implementation like Cassandra can be configured to operate as the non-volatile storage 170 of the KGS system.

An indexing search engine 180 is used to index and search the knowledge graph 950. For scalability purposes, a distributed, scalable indexing search engine 180 is useful. An example of such an implementation is Elasticsearch, a distributed, scalable search engine that provides near real-time search capabilities. An indexing search engine indexing search engine 180 like Elasticsearch can be configured to operate as the indexing search engine 180 of the KGS system.

A graph crawler 960 may be used to traverse and query the knowledge graph 950. A graph traversal language such as Gremlin can be used to automatically implement efficient graph traversal strategies.

A graph access module 970 may be used to secure the information within a knowledge graph and to assign access rights to various users which allow a user to view and modify nodes and edges in a knowledge graph which are determined by the granted access rights.

A graph analyzer 980 may be used to perform graph analysis on the knowledge graph. In particular, graph analyzer 980 may be configured to perform offensive and defensive cybersecurity analysis on a knowledge graph comprising cyber-physical system information associated with an organization or enterprise. For example, offensive cybersecurity analysis can be considered in the form of an entire attack chain, but can also be played under a partial observability framework. In this model, graph analyzer 980 can consider the relative look ahead depth and branching factors associated with the set of cumulative scenarios to be considered. This is relevant in considering how uncertainty reflective knowledge graphs and the cumulative response of attacker or defender uncertainty reductions/knowledge gains over a series of successive steps (limited by branching factor limits) enable playing out the hypothetical range of future scenarios of interest.

In some implementations, knowledge graph 950 may represent a cyber-physical system of interest. A cyber-physical system may be a representation of an organization's IT and network infrastructure including physical devices (e.g., hardware, computers, servers, routers, switches, gateways, Internet-of-Things devices, etc.), software (e.g., applications, services, APIs, firmware, etc.), and individuals (e.g., administrators, general users, organizational actors, etc.). A knowledge graph of a cyber-physical system may be referred to herein as a cyber-physical graph. Cyber-physical graph may comprise a plurality of vertices which can represent either a physical device, a software, or an individual, and at least one or more edges between and among vertices which represent relationships and/or dependencies both explicitly expressed or implicitly inferred using graph analysis mechanism (e.g., graph crawler 960). For example, the edges between a vertex associated with an administrative computing device and a vertex associated with a general user may indicate that the general user is allowed to access the administrative device during certain time periods of the day or that the administrative device requires a ticket (e.g., Kerberos ticket) to access by general user. A node representing a physical device may comprise a plurality of descriptive information and/or characteristics related to the physical device such as, for example, device configuration information (e.g., physically and/or logically connected/paired devices, device access permissions, device identification numbers, IP addresses, operating system information, software/firmware versions, update status, current operating status, historical operating status, etc.). A node can be considered a complete and comprehensive representation of a physical device, software, and/or individual within an organization's IT network infrastructure. In some implementations, the knowledge graph is updated in real-time with current device data to reflect the current operating state of an organization's cyber-physical system. As a result, the cyber-physical graph lends itself well to analysis related to cybersecurity attacks.

Figure 10:
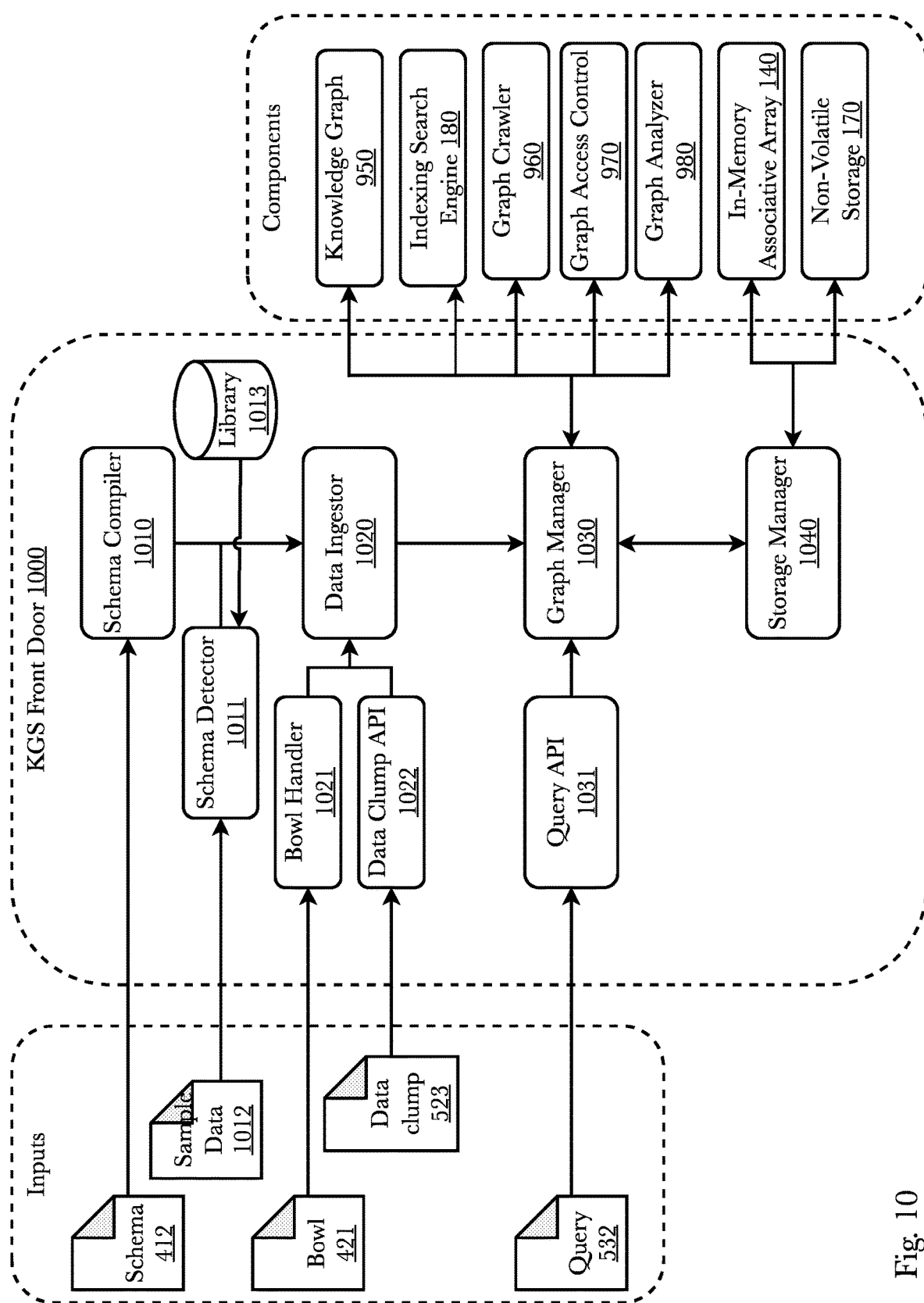
FIG. 10 is a block diagram showing additional detail regarding the KGS front door aspect of a KGS system.

FIG. 10 is a block diagram showing additional detail regarding the KGS front door 1000 aspect of a KGS system. The KGS front door comprises a schema compiler 1010, a schema detector 1011, a data ingestor 1020, a bowl handler 1021, a data clump API 1022, a graph manager 1030, a query API 1031, and a storage manager 1040. Each of these components of the KGS front door 1000 manages and coordinates the operation of one or more of the components that make up the KGS system 100 (which, as noted earlier, may comprise distributed, cloud-based services in some embodiments).

The schema compiler receives a schema 412, compiles the text of the schema into abstract data objects, and stores the abstract data objects associated with the schema in a catalog. The catalog (not shown) may be a database stored in the distributed database 150. The bowl handler 1021 receives a bowl 421 and sends it to the data ingestor 1020. The data ingestor 1020 feeds the bowl 421 to the graph manager, which creates a new (empty) knowledge graph 150 for storage of data. The data clump API 1022 receives data clumps 1023 (e.g., of business data) fed into the system and sends them to the data ingestor 1020, which ingests the data clumps 523, making sure the ELA records are validated and enforced against the schema 412 associated with the target bowl 421. In some embodiments, the data clump 523 is ingested atomically, wherein the ingestion of the data clump 523 must either completely succeed (write all ELA records), or completely fail (with no persistent effect). This atomic ingestion of data clumps 523 provides protection against invalid data being gradually introduced into the knowledge graph 150. The graph manager 1030 coordinates creation of the knowledge graph 140, indexing and management of the knowledge graph 150, and queries of, and operations on, the knowledge graph 150. The graph manager 1030 may use one or more distributed, cloud-based services to implement each of these functions, retaining for itself the role of coordinating the interaction of the various services. The query API 1031 receives queries 532, and sends them to the graph manager 1030, which then coordinates the operations on the knowledge graph 950, the indexing search engine 180, and the graph crawler 960, as necessary to implement the query 532 and return appropriate results. The storage manager 1040 coordinates the operations and interactions of the in-memory associative array 140 and the non-volatile storage 170, which are backend functions of the system not normally seen or accessed by users of the system.

In some implementations, schema detector 1011 may be present and configured to infer a schema or attempt to apply known schemas from a library 1013 to the organization's data 1012 to determine compliance or applicability. For example, schema detector 1011 can consider "whole" schema trials (e.g., attempts) and "combinatoric" attempts where elements of an abstract schema are attempts and ran over some amount of data to look for errors and generate "proposed" schema options (whole or combinatorically generated) for a user (e.g., schema modeler 410) to optionally select (e.g., based on lowest error rates). Schema detector 1011 can be configured to apply known schemas from a schema library 1013 which can be any non-volatile data storage device or may be stored in an in-memory associative array, dependent upon the embodiment. Schema detector 1011 may select known schemas to use in an attempt to infer an organizations data schema based on known information associated with the organizations data and/or structure. In some implementations, information about the type of data, its structure, its size, metadata, etc. that can be obtained via preprocessing may be used by schema detector 1011 to infer an organization's schema and/or to apply a known schema from library 1013. In some implementations, schema modeler 410 can provide information related to the organization to schema detector 1011 which can be used to infer an organization's schema or apply a known schema from library 1013 to identify an organization's schema.

A schema can be used to constrain network events to build a constrained knowledge graph (i.e., constrained cyber-physical graph) comprising network events matching the schema. The schema may include any information about the organization, including but not limited to, the organization's legal structure, business operational structure, personnel, data locations, data hierarchy, data sources, network structure, etc. An organization may have more than one schema. The schema defines entities, links, and attributes (ELAs), with entities (e.g., physical devices, software, individuals) being data points of interest, links being relationships between the entities, and attributes being additional descriptors (e.g., device configuration) that define either the entities or links.

In some implementations, graph manager 1030 is configured to fuse nested graphs together to generate a larger knowledgebase for representing a constrained network. Graph manager 1030 may be configured to align two or more nested graphs or subgraphs by identifying entities in the two or more knowledge graphs that refer to the same real-world object (e.g., physical device, software, individual, etc.). For example, graph manager 1030 may identify the entity "John Snow" from a first knowledge graph may also be the same entity as "King of the North" from a second knowledge graph based on various edges, relationships, attributes, and/or characteristics. Furthermore, graph manager 1030 may fuse two or more knowledge graphs (e.g., nested graphs) that have been determined to share linked entities to create a larger fused knowledge graph. According to an embodiment, graph manager 1030 may use a similarity score to determine which knowledge graphs have linked entities. The similarity score may be compared to a predetermined threshold, and if the threshold is met or exceeded, graph manager 1030 will fuse the respective entities and/or knowledge graphs. The resulting fused knowledge graph allows the system and/or a system user to identify and respond to potential cybersecurity threats by determining a threat using cross-graph analysis and reasoning.

In some implementations, system 900 and/or KGS front door 1000 is configured to allow data transformations on non-compliant data. For example, a dataset may be normalized to conform to a schema for graphing. In some embodiments, a data source may be a user, a device, such as a user device, a system, a network, a physical facility, a data store, or a service, such as a service operating in a cloud environment. Graphs built using transformed data may be considered or referred to as composite graphs using original and transformed data as appropriate. Transformations can be applied to an existing graph and/or dataset to generate derivative graphs (e.g., "what if we changed this", "what if this assumed value was different", or "what if we view the data in this context", etc.).

Data ingestor 1020 may be implemented to preprocess a dataset (e.g., data stream, data clumps, etc.) to identify entity information and event information. As used herein, an entity broadly refers to something that exists as itself, whether physically or abstractly. In certain embodiments, an entity may be an individual user, a group, an organization, a government, an item, a device, a system, a network, a domain, an operation, a process, a service, a geographical location, or a physical facility. As used herein, entity information broadly refers to information associated with a particular entity and in various embodiments, the entity information may include certain types of content. Such content may include (non-limiting) text, unstructured data, structured data, graphical images, photographs, audio recordings, video recordings, biometric information, metadata, and the like. According to some embodiments, entity information may include entity role information which broadly refers to information associated with an entity's behaviors, rights, expectations, norms, authorities and obligations. Roles may be achieved, ascribed, permanent, temporary, situational, conditional, presumed, or transitory.

As used herein, an event broadly refers to an action or an activity enacted by an entity. Examples include, but are not limited to, making a phone call, sending a text or email, using a device, accessing a system, requesting credentials, and entering a physical facility. Other examples of events include modifying, uploading, or downloading data. Further examples of events include interactions between a user and a device, interactions between a user and a network, and interactions between a user and a resource. In some implementations, the resource may include a physical facility, a system, a data store, or a service, such as a service operating in a cloud environment. The foregoing is not intended to limit the scope or intent of the invention and skilled person of the art will recognize that many such examples and embodiments are possible. As used herein, event information broadly refers to information associated with a particular event. In various embodiments, the event information may include certain types of content. In certain embodiments, such content may include text, unstructured data, structured data, graphical images, photographs, audio recordings, video recordings, and so forth. In certain embodiments, the event information may include metadata.

In certain implementations, a schema is utilized to generalize entity and event information that may be heterogeneous or disparate, yet substantively similar in concept, as well as to constrain network events to build a knowledge graph representing a cyber-physical system before, during, or after an event has been detected, simulated, or applied to a network. Graph manager 1030 may receive the identified and preprocessed entity and event data from data ingestor 1020 wherein it enforces compliance with a given schema by atomically rejecting non-compliant data and atomically accepting compliant data. Non-compliant data may be referenced to the schema by graph manager 1030 transform it into transformed entity data or transformed event data. In some embodiments, the transformed data may be stored in a data store in a form conforming with the schema. In some embodiments, the transformed data may be added to a knowledge graph thus forming a composite graph using original and transformed data as appropriate.

Also present in the embodiment is a graph access control 970 module configured to provide access control mechanisms to support knowledge graph security. Graph access control module 970 can provide access control to certain portions (i.e., subgraph(s)) of the knowledge graph. One such implementation to provide access control to a knowledge graph may make use of hierarchically organized graph layers which denote a knowledge graph allowing layers of different granularity for the information stored. The lowest layers of the knowledge graph may include all basic facts. These may be created individually by users. All higher levels of the knowledge graph represent summary nodes of a larger group of nodes of the next lower layer of the structured knowledge graph. Graph access module 970 may use the hierarchically organized graph layers to assign access rights to users or entities. The term access right may denote the ability of a user to access information, in particular, the content of the node of a knowledge graph, in a determined way. A user may see a node, may actively access all portions of the content, may modify content, and/or may modify links to other nodes with or without changing a way in factor for a respective link. In case no access right exists for a user to a certain node, that specific node may not be visible for inspection by a user or may not be accessed by a process originating from the user (e.g., a search process of a search engine).

A success factor for the usability of a knowledge graph by a large number of users is to manage access rights to different nodes of the knowledge graph. Different types of users may exist having different access rights, but also different needs to access the content of the knowledge graph. Graph access control module 970 provides dynamic access control to a node in a knowledge graph by structuring the nodes of the knowledge graph into a plurality of hierarchically organized graph layers. Furthermore, access control module 970 can assign to a user an access right to a node for user, and changing the access right dynamically depending on one chosen from a knowledge graph structure. Knowledge graph access rights/privileges may then become user/account attributes, which can be added to the knowledge graph or stored in a user/account profile in a database. Access rights may be considered as authentication tickets which grant privileges to knowledge graphs or portions thereof, similar to how Kerberos tickets allow access to network resources or applications.

Additionally, or alternatively, graph access control module 970 may implement security zones within a knowledge graph, according to some embodiments. The use of security zones within a knowledge graph facilitates variable authorization granularity wherein users can have access to specific pieces of information, or "regions" of a knowledge graph, or entire graphs. Security zones within a knowledge graph may be implemented by graph access control module 970 by first assigning each node in a knowledge graph to one of several zones. In some implementations, the zone are non-intersecting. Once all nodes have been assigned to zone, then an access graph is determined comprising a list of all zones of the knowledge graph, wherein each list entry is related to one zone and to a list of zone-related node identifiers, indicative of nodes being assigned to the one zone, such that the one zone comprises one or more of the nodes with individual access rights. Furthermore, a dataset may be stored relating to an edge of a knowledge graph, a first zone identifier, indicative of a fist zone where the edge ends, and a second zone identifier, indicative of a second zone where the edge ends. The access graph, in contrast to the knowledge graph, comprises one access node for each zone and access edges representing one or more edges between respective zones. In some implementations, an edge weight may be stored in the dataset of the edge of the knowledge graph. Thus, the access node in the access graph represents one or more nodes in the knowledge graph and an access edge may represent several edges which connect nodes of the two or more zones in the knowledge graph. Once the security zones for a knowledge graph have been determined, users may be granted access to one or more zones within the knowledge graph, thereby securing the knowledge graph from unrestricted access and modifications.

Detailed Description of Exemplary Aspects

Figure 6:
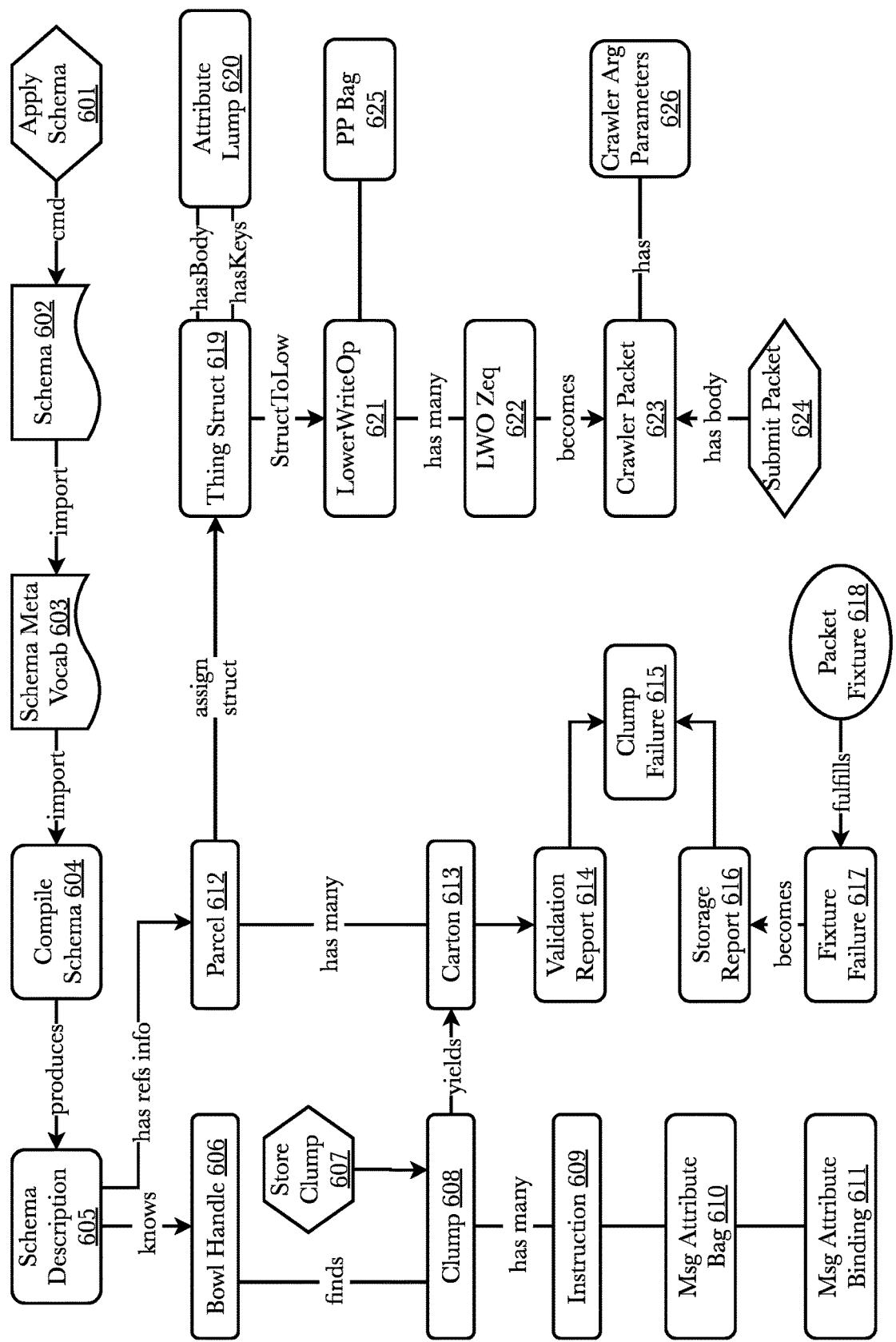
FIG. 6 is a data abstraction showing an exemplary implementation of an ontological data model for a KGS system.

FIG. 6 is a data abstraction showing an exemplary implementation of an ontological data model for a KGS system. An apply schema command 601 imports the schema 602 and any schema meta vocabulary 603 and compiles them into abstract data objects 604, which results in a schema description 605 as an output. The schema description 605 knows what bowl handles 606 are available and has reference information for parcels 612.

When a store clump command is issued 607, the bowl handle 606 finds the data clump 608 to be stored. The data clump 608 has instructions to write concrete things (entity and link data) into the knowledge graph, each thing (entity or link) having one or more message attributes 610 and message attribute bindings 611. Ingestion of the data clump 608 yields a carton 613 of data objects with schema references, the carton 613 containing one or more parcels 612. A enforcement report 614 is created for the carton 613, which will result in a clump ingestion failure 615 if the data clump 608 contains any invalid data. Another path to clump ingestion failure 615 occurs when a packet fixture 618 is submitted which results in a fixture failure 617, resulting in a storage report 616 indicating a clump ingestion failure 615.

Each parcel 612 contains instructions for creating structures from thing types (entity and link abstractions). For each parcel 612 referenced in the schema description 605, a thing structure 619 is assigned which is a navigable object in the knowledge graph, each thing structure 619 having an attribute lump 620 which is a resolved object that has keys and a body for the thing structure 619. Each thing structure 619 is incorporated into the knowledge graph structure with a lower write operation 621, each of which has one or more lower write operation sequences 622, and accesses a PP bag 625 of resolved attribute data. These lower write operation sequences 622 become crawler packets 623, each of which has crawler argument parameters, and each of which can be used to traverse the knowledge graph. A submit packet request 624 initiates the crawler packet 623 operation.

Figure 7:
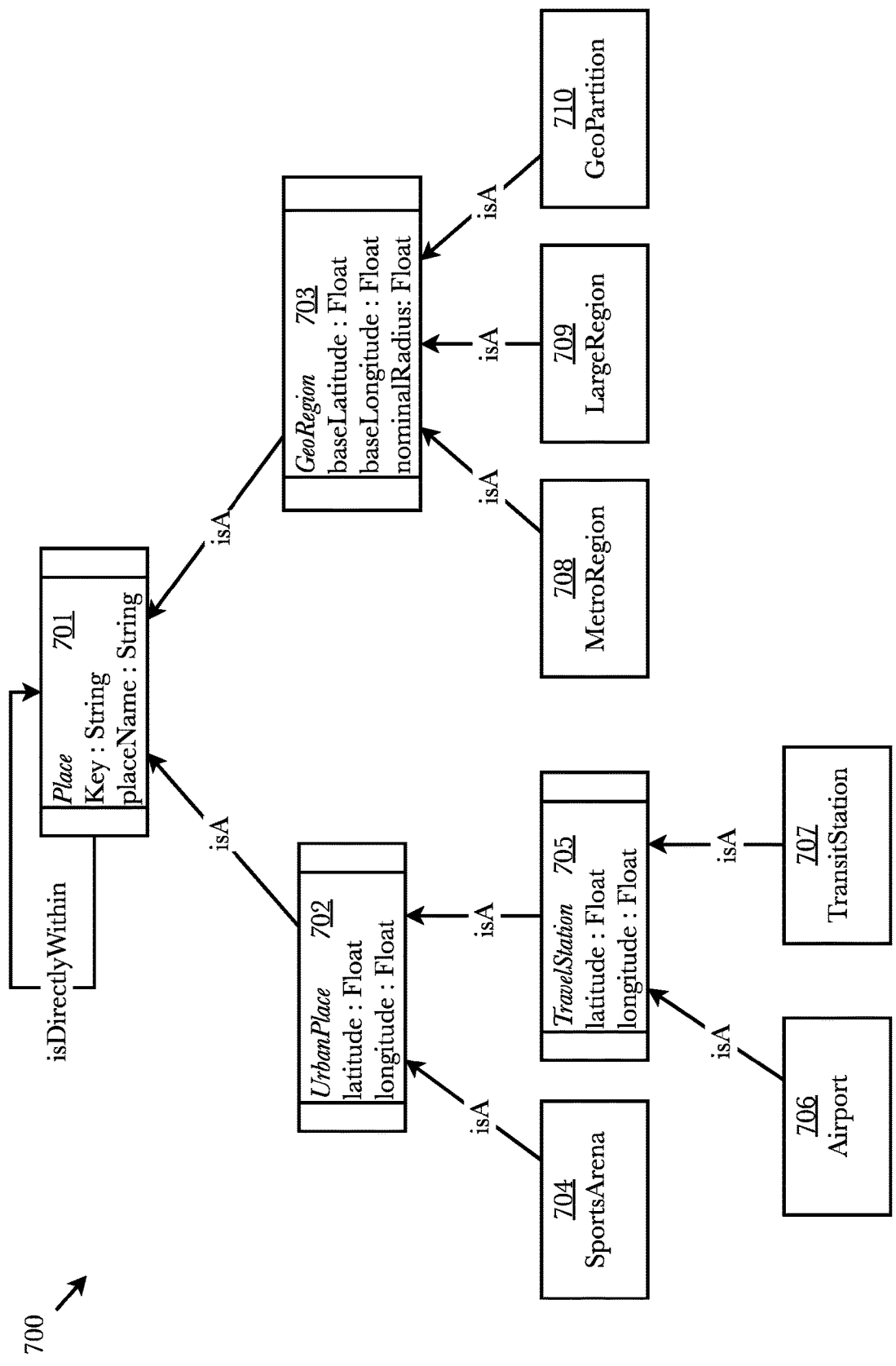
FIG. 7 is a relational diagram showing an exemplary knowledge graph abstraction.

FIG. 7 is a relational diagram showing an exemplary knowledge graph abstraction 700. As a top level, a Place abstract type 701 may contain one or more attributes such as a key and place name. Some levels of abstraction may have recursive references to themselves, as shown in the top level place abstract type 701. The place abstract type 701 in this example contains two lower level abstract types, UrbanPlace 702 representing a location within a city, town, etc. and GeoRegion 703 representing geographical regions of various sizes, both containing one or more attributes that further describe the abstraction such as latitude and longitude. UrbanPlace 702 contains a TravelStation 705 abstract type and a SportsArena 704 concrete entities (indicating a particular instance of the abstract type above it). The TravelStation abstract type 705 contains two concrete entities, an airport 706 and a transit station 707. The GeoRegion abstract type 703 contains three concrete entities, a metro region 708 (i.e., city, town, etc.), a large region (i.e., county, province, etc.), and geographical partitions (i.e., continents, subcontinents, etc.). A person of ordinary skill in the art will recognize that this is a simplified example, and that many such abstractions are possible.

Figure 8:
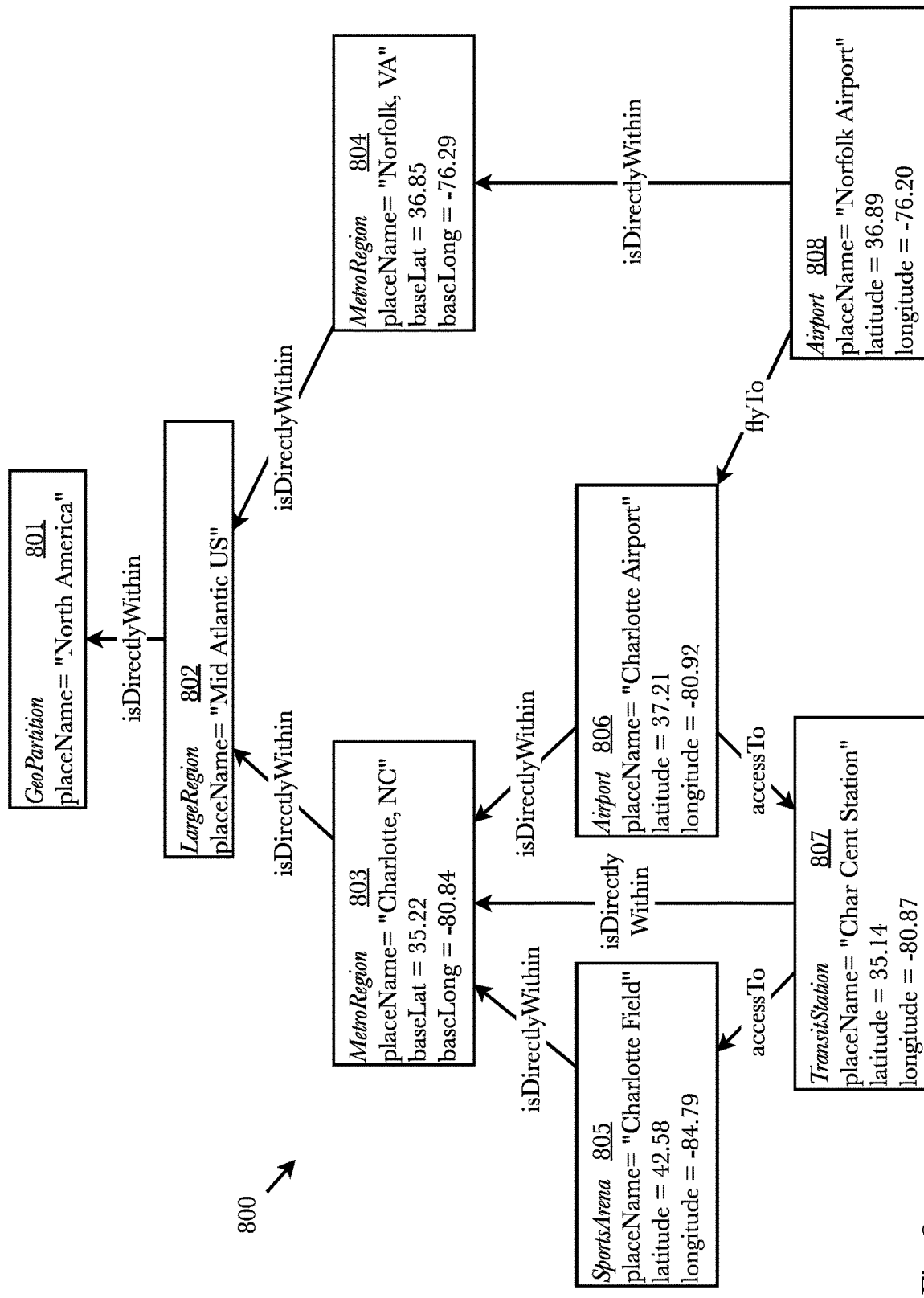
FIG. 8 is a relational diagram showing an exemplary knowledge graph implementation.

FIG. 8 is a relational diagram showing an exemplary knowledge graph implementation. In this implementation, the GeoPartition 801 is the highest level entity representing North America, with the LargeRegion 802 being contained within the GeoPartition 801, and representing the Mid-Atlantic United States. The LargeRegion 802 entity contains two metro region entities, a MetroRegion representing Charlotte, NC 803 and a MetroRegion representing Norfolk, VA 804. The Charlotte Field SportsArena 805, the Charlotte Airport 806, and the Charlotte Central Station TransitStation 807 are each contained within the Charlotte, NC 803 entity. There is access from the Charlotte Airport 806 to Charlotte Field 805 via Charlotte Central Station 807. The Norfolk Airport entity 808 is contained within the Norfolk, VA entity 804, and contains a transit link (via air travel) to the Charlotte Airport 806. In this simplified knowledge graph, traversals of the graph provide information about relative locations of, and transit connectivity between, various regions and locations. A person of ordinary skill in the art will recognize that this is a simplified example, and that many such implementations are possible.

Figure 11:
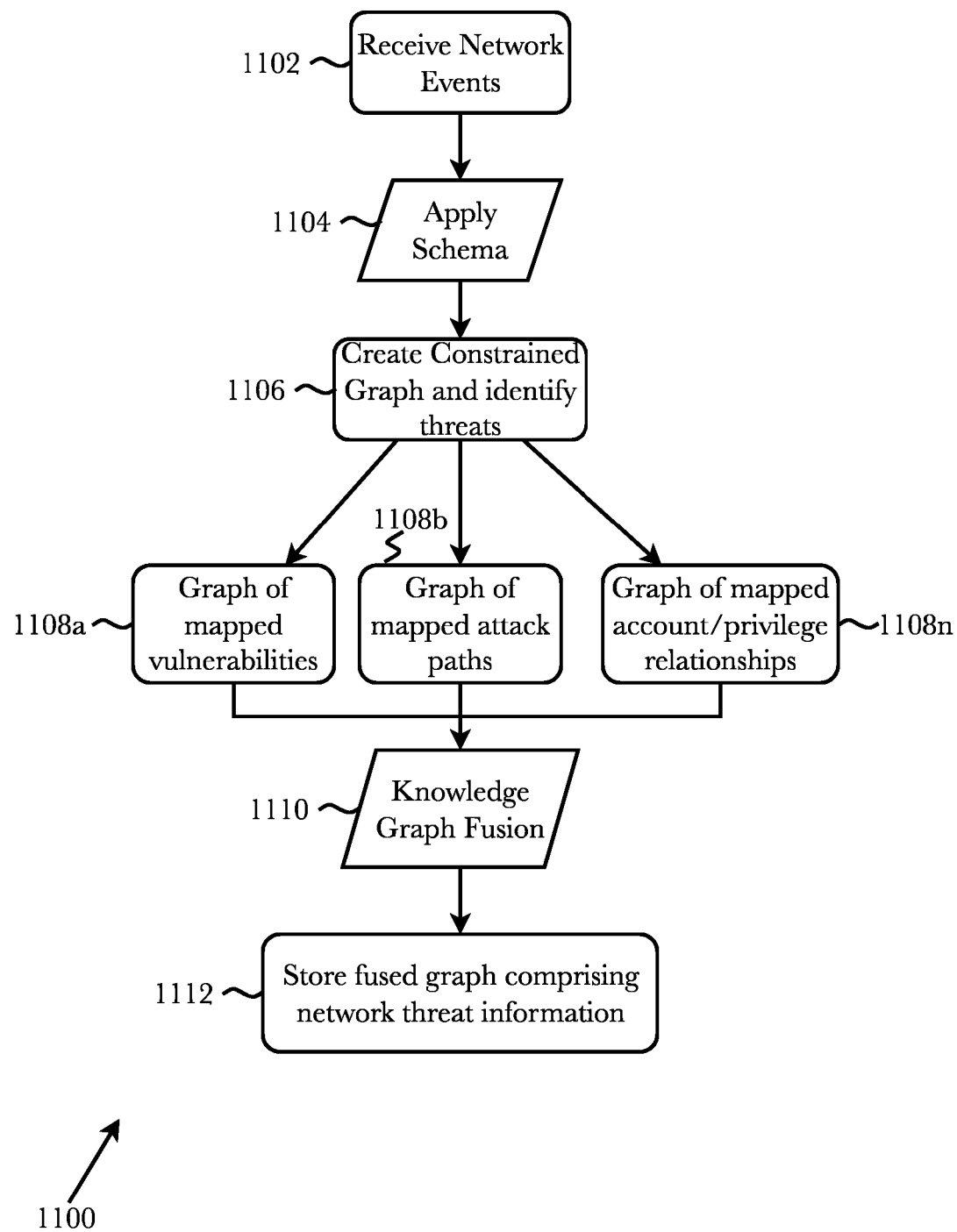
FIG. 11 is a flow diagram illustrating an exemplary method for fusing knowledge graphs together, according to an embodiment.

FIG. 11 is a flow diagram illustrating an exemplary method 1100 for fusing knowledge graphs together, according to an embodiment. This method may be stored as machine-readable programming instructions in a memory and executed by a processor of a computing device. According to the embodiment, the process begins at step 1102 when graph manager 1030 receives network event data. In some implementations, the network event data is related to a cyber-attack or a cyber-threat posed to a network of interest. As a next step 1104, a schema is applied to the network event data to constrain the network event data to the schema and create a constrained knowledge graph and then identify threats in the constrained knowledge graph at step 1106. The applied schema may be associated with graph bowl which can be used as the template for the constrained knowledge graph comprising constrained network event data. From the constrained knowledge graph and using the identified threats, a plurality of subgraphs or nested graphs may be created at steps 1108a-n. Each of the plurality of subgraphs may be created to relate to a possible threat scenario using the threats identified in step 1106. For example, identified threats may be used at step 1108a-n to create a subgraph of mapped vulnerabilities based on an identified threat, create a subgraph of mapped attack paths, and create a subgraph of mapped account/privilege relationships between and among entities and events in the subgraph, respectively. At step 1110 knowledge graph fusion is applied to each of the plurality of subgraphs in order to output a fused knowledge graph comprising network threat information. As a last step 1112, the outputted fused knowledge graph can be stored in a database wherein it may be accessed or queried to perform graph analysis or graph query actions. For example, a fused graph may be analyzed for offensive and defensive cyber-attack scenarios and outcomes.

As an exemplary use case, system 900 and/or one of its components may receive network event information from a security system representing a threat or attack. These network events may be used to create an initial, constrained context knowledge graph built it part on context data about the network event. The constrained knowledge graph comprises activity nodes connected to root nodes which together represent a context for a network event. The constrained knowledge graph, and potentially other data sources, are then explored (e.g., to identify threats) to further refine the constrained graph into one or more subgraphs or nested graphs. These subgraphs may be explored by an analyst for further review and analysis. Furthermore, these subgraphs can be fused together to form a fused knowledge graphs which represents a refined knowledge graph representing a network event or events. Exploration of a knowledge graph can include locating activity nodes and their connections in the knowledge graph, determining that they are associated with known malicious entities, and then fusing the subgraphs into a merged into a knowledge graph.

Figure 12:
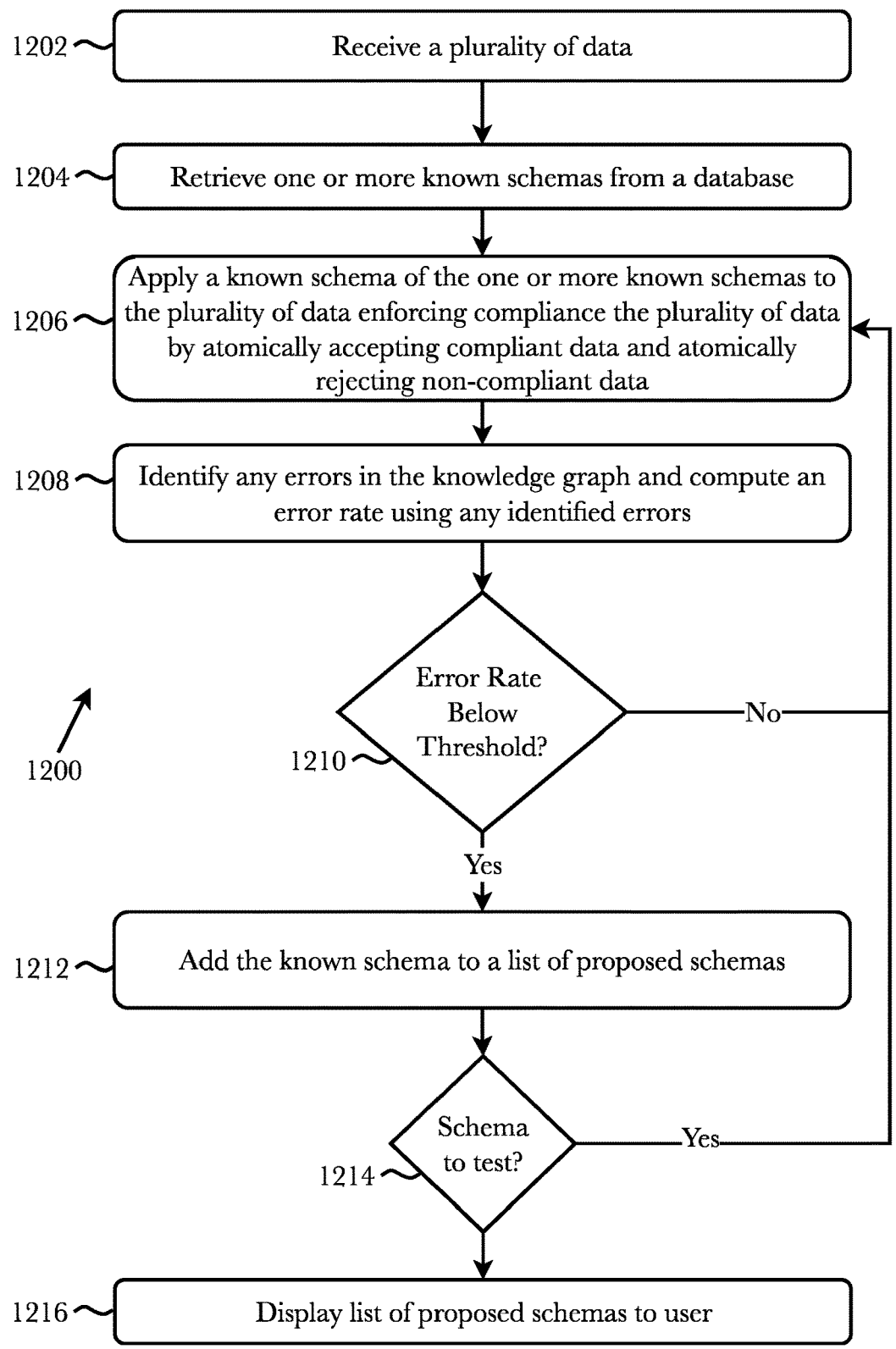
FIG. 12 is a flow diagram illustrating an exemplary method for inferring a schema for a dataset, according to an embodiment.

FIG. 12 is a flow diagram illustrating an exemplary method 1200 for inferring a schema for a dataset, according to an embodiment. This method may be stored as machine-readable programming instructions in a memory and executed by a processor of a computing device. According to the embodiment, the process begins at step 1202 when integration manager 1000 and/or one or more of its components such as schema detector 1011 receives a plurality of data. The plurality of data may be a small dataset of data sourced from a larger dataset such as, for example, a dataset comprised of golden-ticket attacks sourced directly from a larger dataset comprised of multiple types of cyberattacks. In various implementations, the plurality of data may be network event data. In some implementations, the entirety of the received dataset may be attempted to fit a known schema representing a "whole" trial. In some implementations, portions of the received data may be attempted to fit a known schema representing a "combinatoric" trial. The plurality of data may be received from a representative of an organization (e.g., schema modeler 410). The plurality of data may be real data or can be dummy data (e.g., data that is representative of the type/structure of real data but where the true data values have been replaced with different values. The plurality of data may be received it the form of data clumps each of which comprise an entity, link, and attribute data. Schema detector 1011 may retrieve one or more known schemas from library 1013 at step 1204. A schema library 1013 may be present and used as repository or catalog for known schemas. In some implementations, the known schemas may be drawn from a corpus including prior uploaded schemas and/or prior inferred schemas. As a next step 1206, schema detector 1011 applies one of the one or more known schemas to the plurality of data. In some implementations this step may be carried out as part of compliance enforcement wherein compliant data is atomically accepted and non-compliant data is atomically rejected. Compliant data can be added to a knowledge graph. Once a known schema is selected for an attempt at schema inference, it may be sent to knowledge graph engine 1030 where a bowl is created, the bowl representing a knowledge graph defined by the known schema. The plurality of data may be applied to the bowl by adding the data to the knowledge graph. In some implementations, the plurality of data comprises one or more data clumps which can be added, one data clump at a time, to the knowledge graph, dependent upon compliance.

At step 1208, after some amount of the received data has been applied to the known schema via the knowledge graph, any errors in the knowledge graph are identified and some error rate is computed using any identified errors. In some implementations, non-compliant and therefore atomically rejected data may be used as an indication of an error based on its status as a rejected data clump. An error rate may then be calculated and if it is greater than some predetermined threshold value, 1210 then the known schema under trial can be discarded and the process begins again at step 1206 by applying another, different known schema of the one or more known schemas. If instead, the error rate is below some predetermined threshold value (e.g., less than 1.0% error rate) then the next step 1212 is to add the known schema to a list of proposed schemas. The list of proposed schemas may be stored as any suitable text file format (e.g., .txt, .csv, .docx, etc.) in a database or, in some implementations, a temporary cache configured to store proposed schema list data. Another check is made, this type to determine if there are any more known schemas which to trial 1214. If there are more known schemas to trial, then the process begins again at step 1206. If there are no more known schemas to test, then the process proceeds to step 1216 wherein the proposed list of schemas is displayed to a user. The user may then optionally choose to use one of the proposed list of inferred schemas instead of creating and uploading his or her own schema. In this way, a sample of an organization's (i.e., user's) data can be uploaded to the system and a set of schema options can be whole or combinatorically generated.

Figure 13:
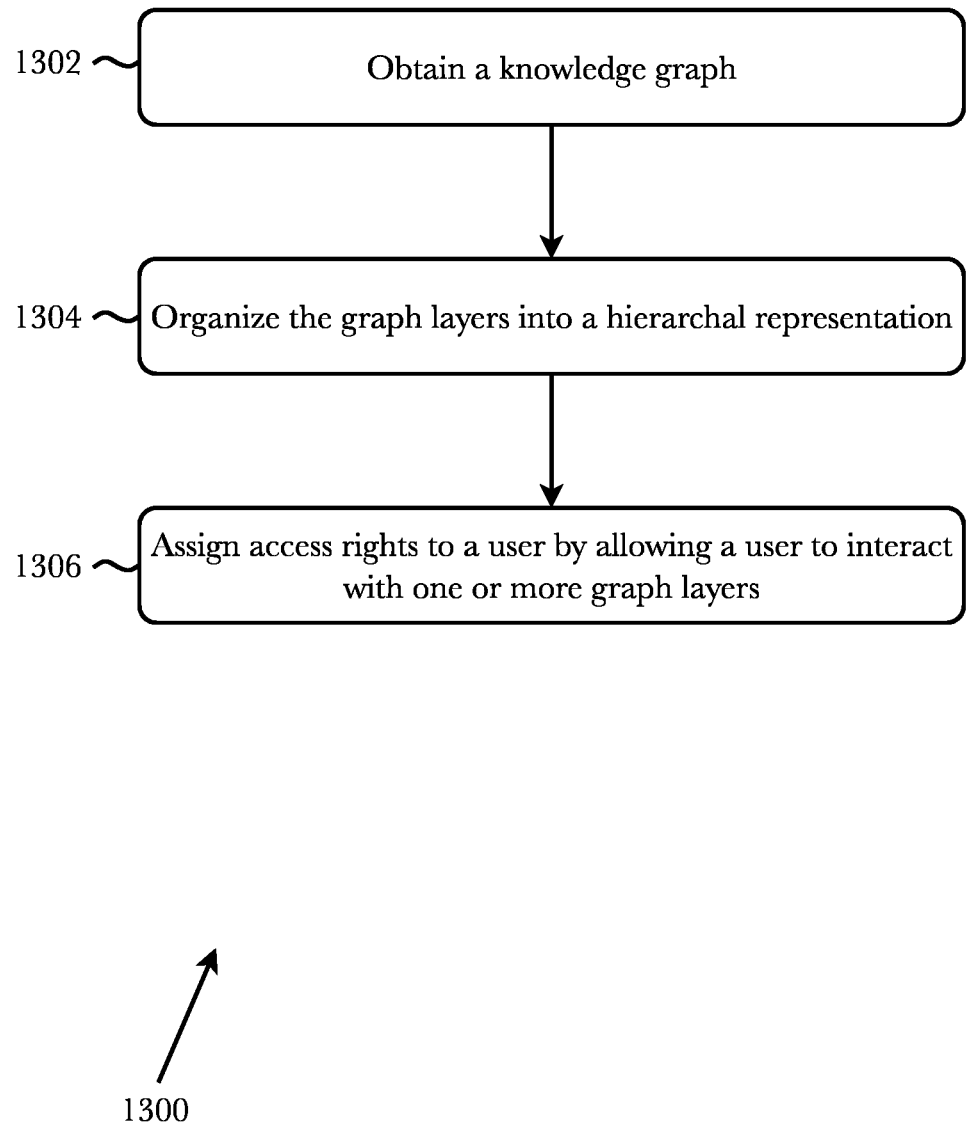
FIG. 13 is a flow diagram illustrating an exemplary method for securing a knowledge graph, according to an embodiment.

FIG. 13 is a flow diagram illustrating an exemplary method 1300 for securing a knowledge graph, according to an embodiment. This method may be stored as machine-readable programming instructions in a memory and executed by a processor of a computing device. According to the embodiment, the process begins at step 1302 when graph access control module 970 receives, retrieves, or otherwise obtains a knowledge graph. In some implementations, the knowledge graph is a cyber-physical graph which represents an organizations cyber-physical system. Once a knowledge graph has been obtained, graph access control module 970 can organize the graph into layers based on a hierarchical representation at step 1304. Graph traversal algorithms or techniques known to those skilled in the art can be used to traverse the entire knowledge graph for structuring nodes of the knowledge graph into a plurality of hierarchically organized graphs layers. As a last step, graph access control module 970 can assign access rights to a user by allowing the user to interact (e.g., provide access for) with one or more graph layers. This provides a system of hierarchical access rights which can be extended or rescinded dynamically based on the current state of the knowledge graph or the cyber-physical system it may be representing or based on other factors.

Figure 14:
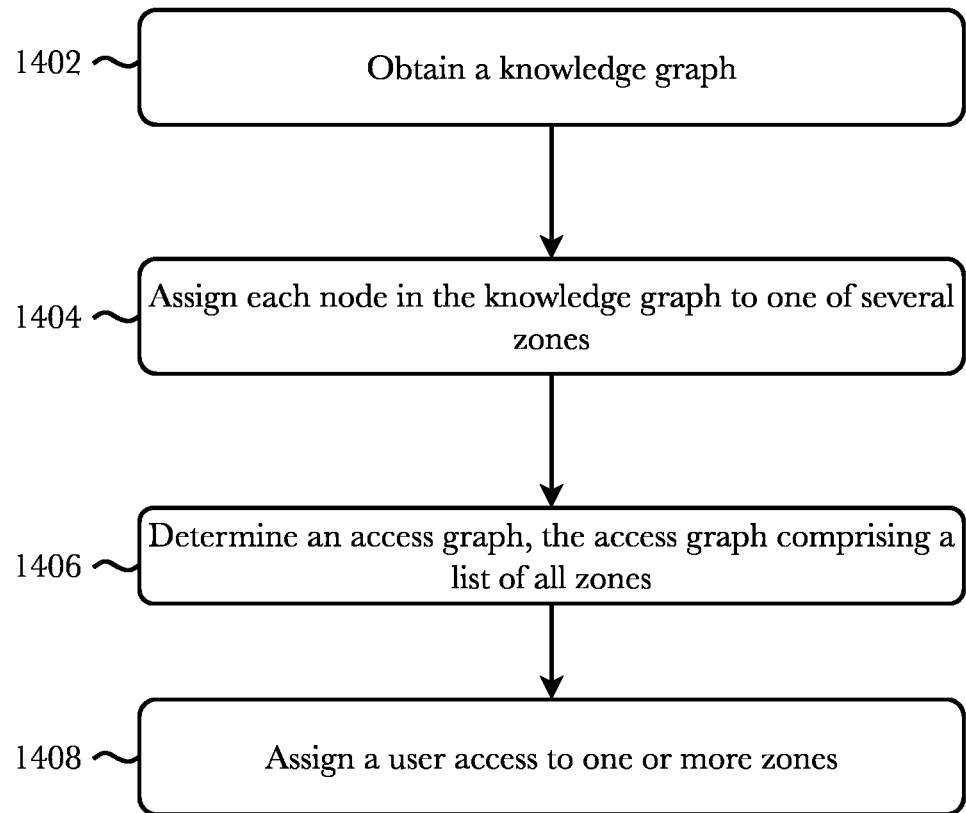
FIG. 14 is a flow diagram illustrating another exemplary method for securing a knowledge graph, according to an embodiment.

FIG. 14 is a flow diagram illustrating another exemplary method 1400 for securing a knowledge graph, according to an embodiment. This method may be stored as machine-readable programming instructions in a memory and executed by a processor of a computing device. According to the embodiment, the process begins at step 1402 when graph access control module 970 receives, retrieves, or otherwise obtains a knowledge graph. In some implementations, the knowledge graph is a cyber-physical graph which represents an organizations cyber-physical system. Once a knowledge graph has been obtained, graph access control module 970 assigns each node in the knowledge graph to one of several zones at step 1404. After each node has been assigned to a zone, the next step 1406 is to determine an access graph, wherein the access graph comprises a list of all zones. As a last step 1408, a user may be assigned access rights to one or more zones, wherein the user is free to interact (e.g., upload, download, modify, etc.) with the nodes and data within their one or more assigned zones.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 15:
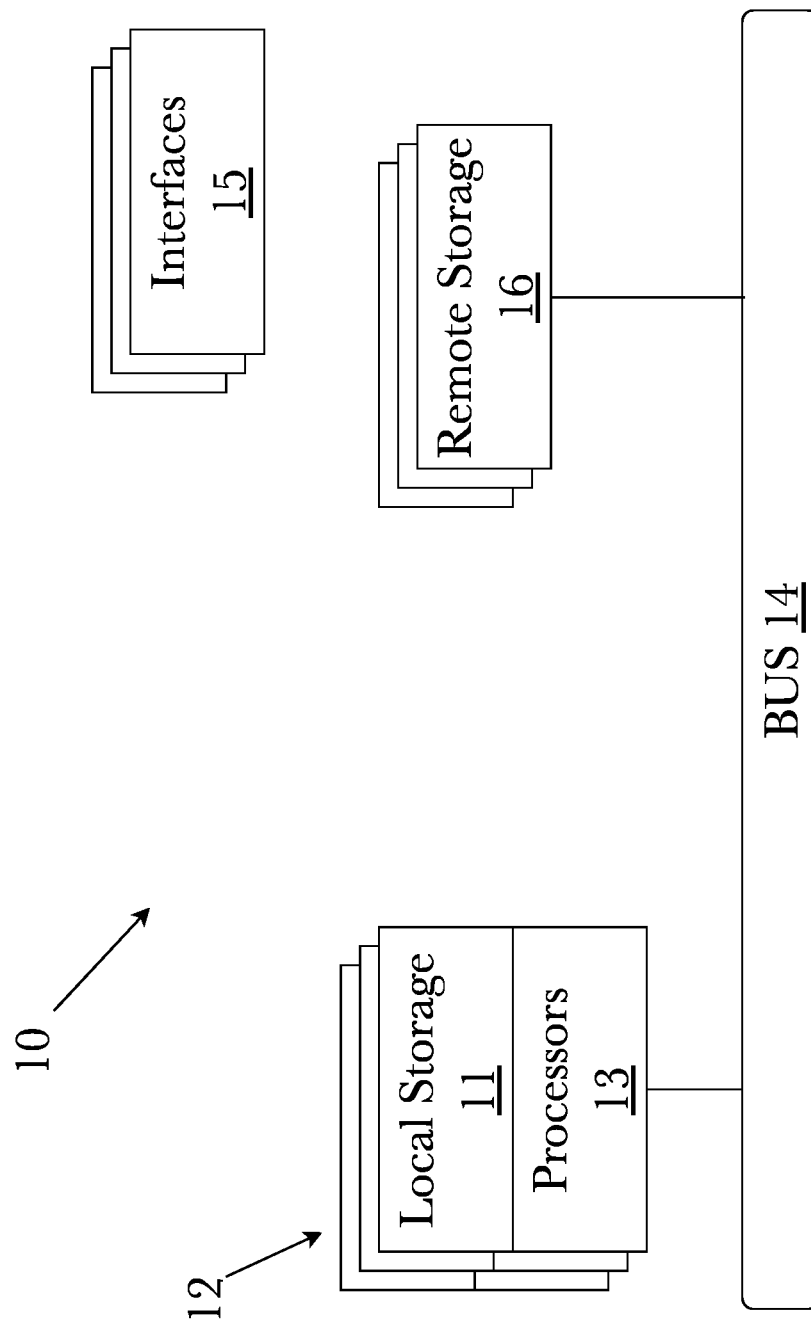
FIG. 15 is a block diagram illustrating an exemplary hardware architecture of a computing device used in various embodiments of the invention.

Referring now to FIG. 15, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 15 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 16:
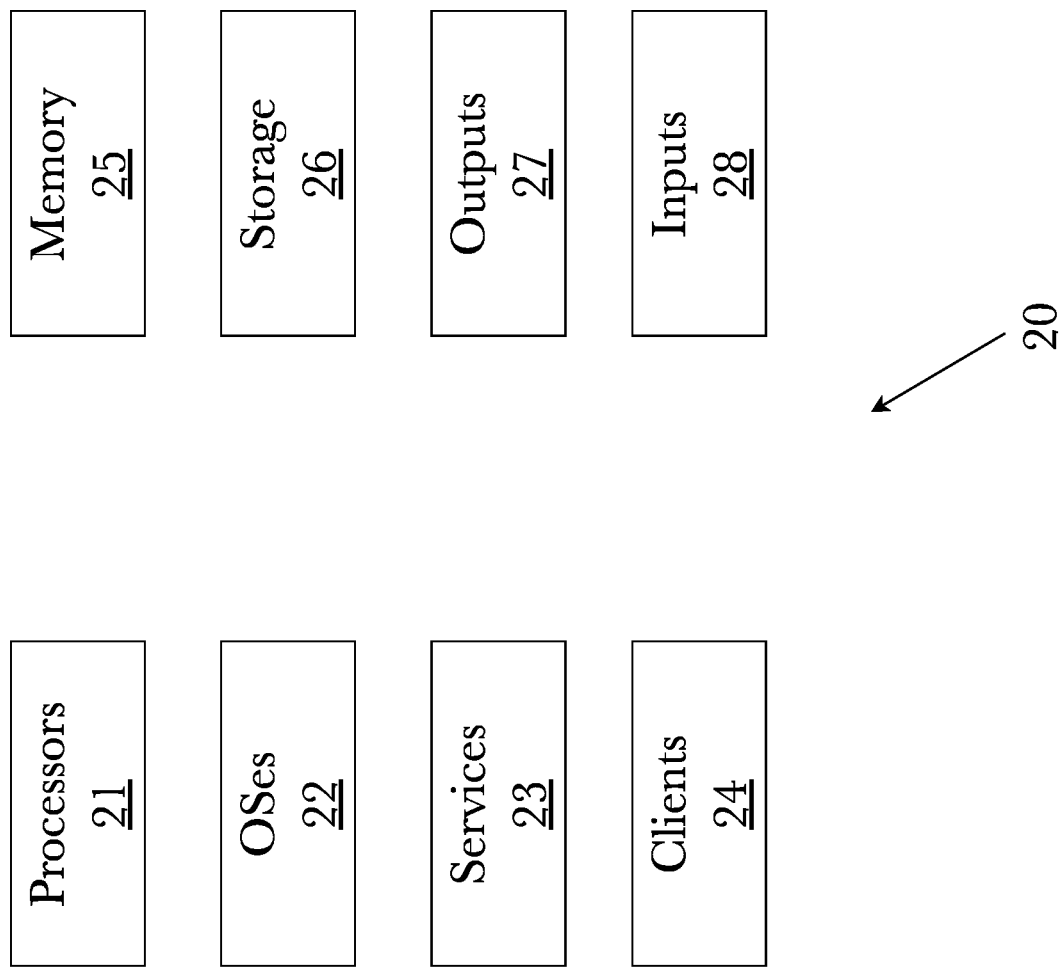
FIG. 16 is a block diagram illustrating an exemplary logical architecture for a client device, according to various embodiments of the invention.

In some aspects, systems may be implemented on a standalone computing system. Referring now to FIG. 16, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 15). Examples of storage devices 26 include flash memory, magnetic hard drive, CD-ROM, and/or the like.

Figure 17:
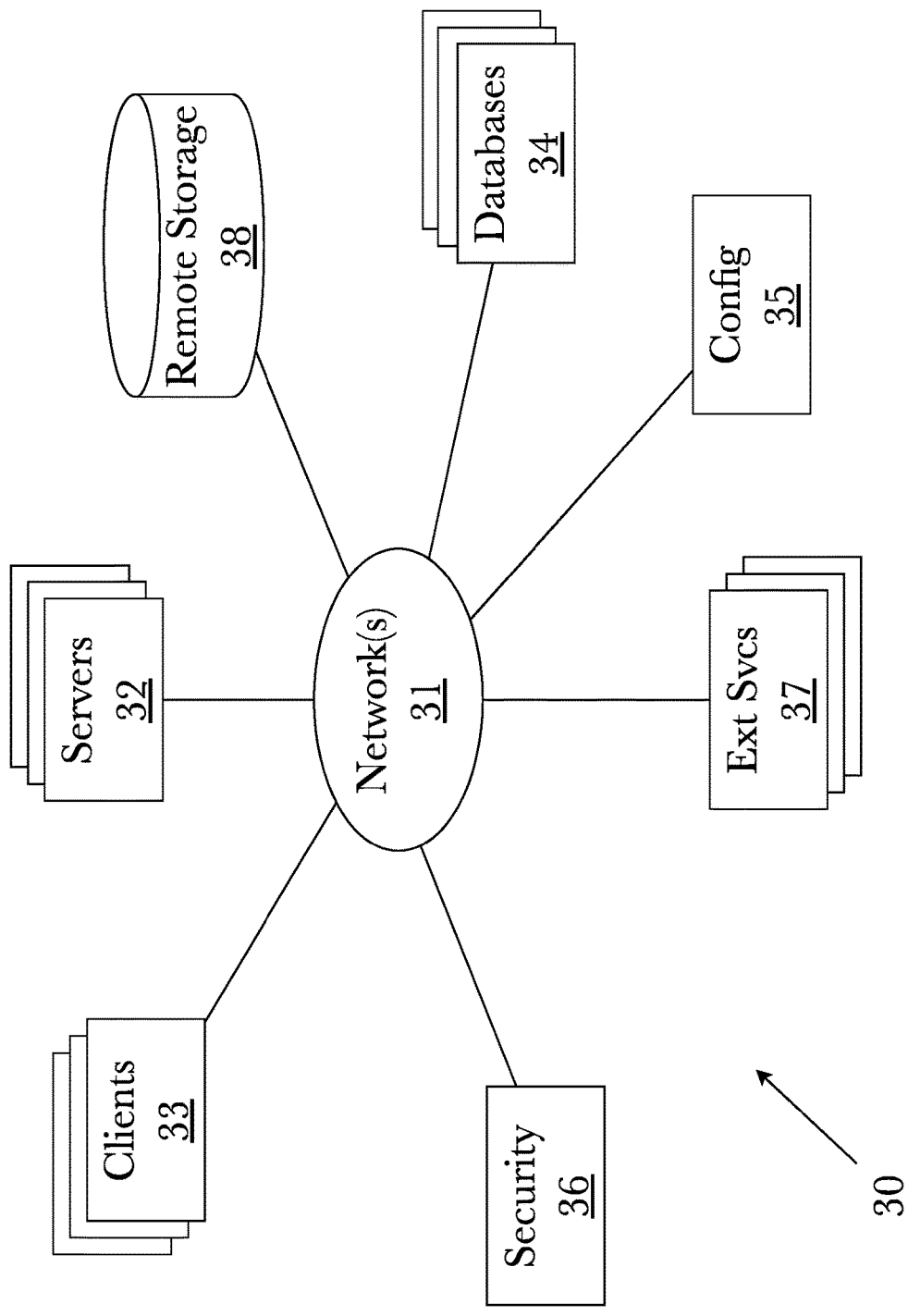
FIG. 17 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 17, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 16. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 18:
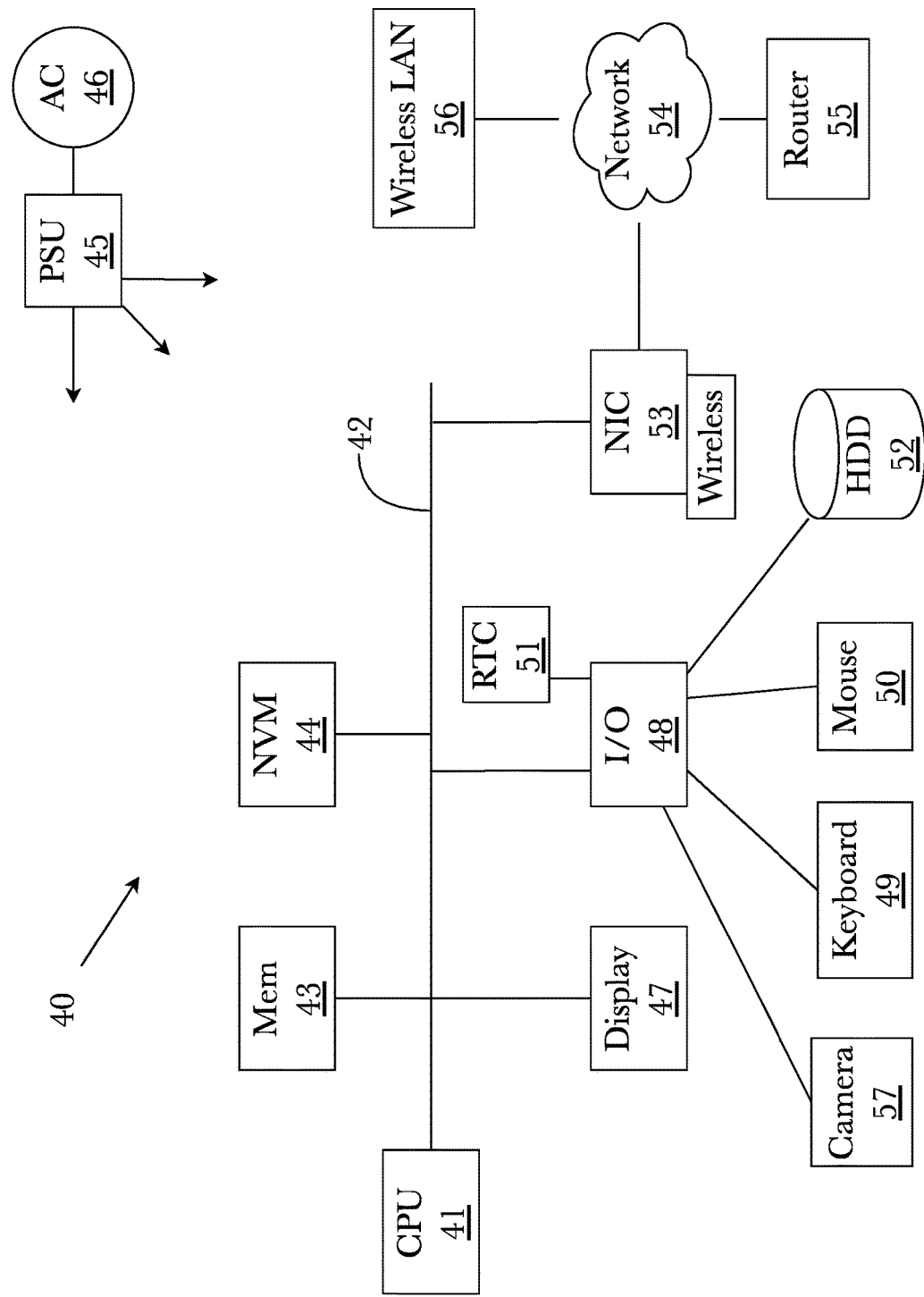
FIG. 18 is another block diagram illustrating an exemplary hardware architecture of a computing device used in various embodiments of the invention.

FIG. 18 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A high-performance, dynamically specifiable knowledge graph system, comprising:
a computing system comprising a processor and a memory;
an in-memory associative array comprising key-value pairs stored in the memory of the computing system and configured to represent a knowledge graph;
an integration subsystem comprising a first plurality of programming instructions that, when operating on the processor, cause the computing system to:
receive one or more data clumps, each data clump comprising entity, link, and attribute data;
determine whether each data clump complies with a schema comprising one or more entity definitions, one or more link definitions, and one or more attribute definitions;
enforce compliance of each data clump by accepting compliant data clumps and rejecting non-compliant data clumps;
send the compliant data clumps to a knowledge graph subsystem for assembly into a new knowledge graph that is fully compliant with the schema; and
the knowledge graph subsystem comprising a second plurality of programming instructions that, when operating on the processor, cause the computing system to:
instantiate the knowledge graph in the in-memory associative array;
receive data clumps from the integration subsystem wherein the data clumps are known to be fully compliant with the schema; and
populate the knowledge graph in the in-memory associative array with the entity, link, and attribute data in each fully compliant data clump.

2. The system of claim 1, further comprising a graph access control subsystem comprising a third plurality of programming instructions that, when operating on the processor, cause the computing system to assign access rights to a user, the access rights allowing the user to interact with a at least one node, and its associated edges, of the knowledge graph.

3. The system of claim 1, wherein the integration subsystem is further configured to:
retrieve one or more known schemas from a database;
apply a known schema to the one or more data clumps;
identify any errors in the application of the known schema to the data clumps and compute an error rate based on any identified errors;
wherein if the error rate is below a predetermined threshold value the known schema is added to a list; and
display the list to a user, wherein the user can optionally select a known schema from a plurality of known schemas on the list.

4. The system of claim 1, further comprising a graph manager subsystem comprising a fourth plurality of programming instructions that, when operating on the processor, cause the computing subsystem to:
receive a network event associated with an observed event;
apply a known schema to create a constrained knowledge graph;
analyze the constrained knowledge graph to identify an operational risk;
generate one or more subgraphs from the constrained knowledge graph based on the identified operational risk, wherein each subgraph maps the identified cybersecurity threat to a threat scenario;

perform graph fusion on the subgraphs to form a fused knowledge graph;
store the fused knowledge graph in a database; and
present the fused knowledge graph to a user for graph or temporal analysis.

5. The system of claim 1, wherein the knowledge graph is a cyber-physical graph representing an enterprise's cyber-physical system.

6. A high-performance, dynamically specifiable knowledge graph system, comprising:
a computing system comprising a processor and a memory;
a distributed in-memory associative array comprising key-value pairs stored in the memory of a plurality of networked computing devices and configured to represent a knowledge graph;
an integration subsystem comprising a first plurality of programming instructions that, when operating on the processor, cause the computing system to:
retrieve a knowledge graph from a knowledge graph service and implement the knowledge graph in the distributed in-memory associative array;
receive one or more data clumps, each data clump comprising entity, link, and attribute data;
determine whether each data clump complies with a schema comprising one or more entity definitions, one or more link definitions, and one or more attribute definitions;
enforce compliance of each data clump by accepting compliant data clumps and rejecting non-compliant data clumps;
send each compliant data clump to the knowledge graph service for assembly into a new knowledge graph that is fully compliant with the schema, wherein the knowledge graph service:
receives data clumps from the integration subsystem wherein the data clumps are known to be fully compliant with the schema; and
populates the knowledge graph in the distributed in-memory associative array with the entity, link, and attribute data in each fully compliant data clump; and
retrieve the populated knowledge graph from the knowledge graph service and update the distributed in-memory associative array with the populated knowledge graph.

7. The system of claim 6, wherein the integration subsystem uses a graph access control subsystem to assign access rights to a user, the access rights allowing the user to interact with a at least one node, and its associated edges, of the knowledge graph.

8. The system of claim 6, wherein the integration subsystem is further configured to:
retrieve one or more known schemas from a database;
apply a known schema to the one or more data clumps;
identify any errors in the application of the known schema to the data clumps and compute an error rate based on any identified errors;
wherein if the error rate is below a predetermined threshold value the known schema is added to a list; and
display the list to a user, wherein the user can optionally select a known schema from a plurality of known schemas on the list.

9. The system of claim 6, wherein the integration subsystem uses a graph manager subsystem to:
receive a network event associated with an observed event;
apply a known schema to create a constrained knowledge graph;
analyze the constrained knowledge graph to identify an operational risk;
generate one or more subgraphs from the constrained knowledge graph based on the identified cybersecurity threat, wherein each subgraph maps the identified operational risk to a threat scenario;
perform graph fusion on the subgraphs to form a fused knowledge graph;
store the fused knowledge graph in a database; and
present the fused knowledge graph to a user for graph analysis.

10. The system of claim 6, wherein the knowledge graph is a cyber-physical graph representing an enterprise's cyber-physical system.

11. The system of claim 6, wherein the integration subsystem, the distributed in-memory associative array, and the knowledge graph service are instantiated as services in a containerized service management application.

12. The system of claim 11, wherein separate instances of the integration subsystem, the distributed in-memory associative array, and the knowledge graph service are used for each client as services in a containerized service management subsystem.

13. A method for operating a high-performance, dynamically specifiable knowledge graph system, comprising the steps of:
instantiating a distributed in-memory associative array comprising key-value pairs stored in the memory of a plurality of networked computing devices and configured to represent a knowledge graph;
retrieving a knowledge graph from a knowledge graph service and implementing the knowledge graph in the distributed in-memory associative array;
receiving one or more data clumps, each data clump comprising entity, link, and attribute data;
determining whether each data clump complies with a schema comprising one or more entity definitions, one or more link definitions, and one or more attribute definitions;
enforcing compliance of each data clump by accepting compliant data clumps and rejecting non-compliant data clumps;
sending each compliant data clump to the knowledge graph service, wherein the knowledge graph service:
receives compliant data clumps from the integration platform; and
populates the knowledge graph in the distributed in-memory associative array with the entity, link, and attribute data in each data clump; and
retrieving the populated knowledge graph from the knowledge graph service and updating the distributed in-memory associative array with the populated knowledge graph.

14. The method of claim 13, wherein a graph access control service assigns access rights to a user, the access rights allowing the user to interact with at least one node, and its associated edges, of the knowledge graph.

15. The method of claim 13, further comprising the steps of:
retrieving one or more known schemas from a database;
applying a known schema to the one or more data clumps;
identifying any errors in the application of the known schema to the data clumps and compute an error rate based on any identified errors;

wherein if the error rate is below a predetermined threshold value the known schema is added to a list; and displaying the list to a user, wherein the user can optionally select a known schema from a plurality of known schemas on the list.

16. The method of claim 13, wherein a graph manager service:

receives a network event associated with a cybersecurity event;

applies a known schema to create a constrained knowledge graph;

analyzes the constrained knowledge graph to identify a cybersecurity threat;

generates one or more subgraphs from the constrained knowledge graph based on the identified cybersecurity threat, wherein each subgraph maps the identified cybersecurity threat to a threat scenario;

performs graph fusion on the subgraphs to form a fused knowledge graph;

stores the fused knowledge graph in a database; and presents the fused knowledge graph to a user for graph or temporal analysis.

17. The method of claim 13, wherein the knowledge graph is a cyber-physical graph representing an enterprise's cyber-physical system.

18. The method of claim 13, wherein the distributed in-memory associative array and the knowledge graph service are instantiated as services in a containerized service management application.

19. The method of claim 18, wherein separate copies of the distributed in-memory associative array, and the knowledge graph service are instantiated for each client as services in a containerized service management application.

* * * * *